US011805425B1

(12) United States Patent
Kappes et al.

(10) Patent No.: US 11,805,425 B1
(45) Date of Patent: Oct. 31, 2023

(54) FWA DEVICE SELF-INSTALLATION APPLICATION WITH DUAL SIM CAPABILITY

(71) Applicant: INSEEGO CORP., San Diego, CA (US)

(72) Inventors: James Kappes, San Diego, CA (US); Sangram Tidke, San Diego, CA (US)

(73) Assignee: INSEEGO CORP., San Diego, CA (US)

( * ) Notice: Subject to any disclaimer, the term of this patent is extended or adjusted under 35 U.S.C. 154(b) by 19 days.

(21) Appl. No.: 17/716,727

(22) Filed: Apr. 8, 2022

(51) Int. Cl.
| | |
|---|---|
| H04W 16/20 | (2009.01) |
| H04B 17/391 | (2015.01) |
| H04B 17/373 | (2015.01) |
| H04W 16/24 | (2009.01) |

(52) U.S. Cl.
CPC .......... *H04W 16/20* (2013.01); *H04B 17/373* (2015.01); *H04B 17/391* (2015.01); *H04W 16/24* (2013.01)

(58) Field of Classification Search
CPC .... H04W 16/20; H04W 16/24; H04B 17/373; H04B 17/391
See application file for complete search history.

(56) References Cited

U.S. PATENT DOCUMENTS

| | | | |
|---|---|---|---|
| 10,560,204 B1* | 2/2020 | Patel | H04W 48/12 |
| 2018/0332557 A1 | 11/2018 | Vuornos | |
| 2019/0394524 A1 | 12/2019 | Latini | |
| 2020/0021997 A1 | 1/2020 | Shoshan | |
| 2021/0345080 A1* | 11/2021 | Uy | H04W 12/06 |
| 2022/0360972 A1* | 11/2022 | Ross | H04W 4/50 |

FOREIGN PATENT DOCUMENTS

WO   2020231758   11/2020

OTHER PUBLICATIONS

ASUS, "ASUS Router," Google Play, ASUSTeK Computer Inc., 5 pages (https://play.google.com/store/apps/details?id=com.asus.aihome&hl=en).
Netgear, "MR1100 Ooredoo—Nighthawk M1 Mobile Router," Netgear, 6 pages (https://www.netgear.com/support/product/MR1100RDMES.aspx).
Vodafone, "Vodafone Mobile Wi-Fi Monitor Android Troubleshoot Guide," Vodafone Group Plc, 12 pages (https://www.vodafone.com/content/dam/vodcom/files/mobile-broadband-devices/extras/troubleshoot-guide/Monitor_App_Guide_Android-V2.pdf).
Acrylic Wi-Fi, "Acrylic Wi-Fi Heatmaps—Site Survey WiFi," Tarlogic Research, 11 pages (https://www.acrylicwifi.com/en/wlan-wifi-wireless-network-software-tools/wifi-site-survey-software-acrylic-heat-maps/).
Family Safety Production, "GPS Tracking," Google Play, Family Safety Production, Mar. 17, 2017, 3 pages (https://play.google.com/store/apps/details?id=com.fsp.android.c&hl=en_IN&gl=US).

* cited by examiner

*Primary Examiner* — Duc C Ho
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for effectuating a self-installation application that may be utilized by end users of 5G Fixed Wireless Access (FWA) devices, installation professionals, etc. to optimally locate and position/orient a FWA device relative to an installation environment. Users can view the operating characteristics of multiple networks simultaneously using the application's dual subscriber identity module (SIM) capabilities and receive updates as to the connection strength. Updated displays can include heat maps, speedometers, and rankings with images of relevant locations.

20 Claims, 14 Drawing Sheets

FWA DEVICE SELF-INSTALLATION APPLICATION WITH DUAL SIM CAPABILITY

CROSS-REFERENCE TO RELATED APPLICATIONS

This application is related to co-pending and co-owned U.S. application Ser. No. 17/142,902, filed Jan. 6, 2021, and which is hereby incorporated herein by reference in its entirety.

TECHNICAL FIELD

The present disclosure relates generally to fixed wireless access (FWA) devices, and in particular, to self-installation of FWA devices using an application with dual SIM capability.

DESCRIPTION OF RELATED ART

Wireless communications have become ubiquitous in today's society, and as wireless systems capabilities increase so does the adoption rate of wireless technologies. Today, wireless technologies are fast overtaking and replacing conventional wired technologies and infrastructure.

5 G is a standard promulgated by the International Telecommunication Union (ITU) and the 3$^{rd}$ Generation Partnership Project (3 GPP), with the ITU setting the minimum requirements for 5 G compliance, and the 3 GPP creating the corresponding specifications. 5 G is a successor to the 4 G/Long Term Evolution (LTE) standard and refers to the fifth generation of wireless broadband technology for digital cellular networks. 5 G is intended to replace or augment 4 G/LTE. Touted advantages of 5 G include, e.g., exponentially faster data download and upload speeds, along with much-reduced latency (also referred to as "air latency," i.e., the time it takes for a device to communicate with the network).

The frequency spectrum of 5 G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to poor building penetration. Use of mmWave technology may nevertheless be desirable because the low-band and mid-band portions of the spectrum are already heavily congested with, e.g., TV and radio signals, as well as 4 G/LTE traffic, and so long as the limited coverage area is acceptable, the benefits of mmWave technology can still be realized.

Fixed Wireless Access (FWA) can refer to a method or process of accessing a communications network or internet via fixed wireless networks. Accordingly, FWA can be used to realize 5 G home broadband service over cellular networks. FWA may be thought of as a type of wireless broadband data communication that is effectuated between two fixed locations that are connected by FWA devices and/or equipment. FWA may be useful in areas where implementing wired broadband access (laying cable/wire) is prohibitively expensive, impractical, etc. especially in densely populated areas. In areas were wired broadband access already exists and/or would be cheap to implement, FWA may still be used to support software-defined networking in a wide area network (SD-WAN) with traffic bursting, as a backup to existing networks, etc.

However, as noted above, the frequency of mmWave signals are so high that they cannot penetrate most building materials, e.g., cement or brick, or is attenuated/reflected so much that its utility is lost (e.g., on the order of above 20-50 dB). Even propagation through air results in signal loss, thereby limiting the efficacy of mmWave to smaller areas as alluded to above. Moreover, mmWave signals have poor multipath propagation. Factors that may compound these issues include, for example, a common desire by end users to place equipment wherever they desire (for convenience, aesthetics, etc.). Additionally, if installation is to be performed by a professional installer/technician, proper installation at the outset (without repeated attempts) results in better perceived customer service, and may cut down on the expense and time associated with subsequent attempts at installation. Thus, proper or optimal location/orientation of a FWA device can be an important factor to the success of using a FWA device.

BRIEF SUMMARY OF THE DISCLOSURE

In accordance with one embodiment, a mobile device may comprise: a processor; and a memory unit operatively coupled to the processor, the memory unit including computer code that when executed, causes the processor to: pair the mobile device with a Fixed Wireless Access (FWA) device; locate one or more mobile networks, each of the one or more mobile networks being associated with a subscriber identification module (SIM); determine operating characteristics of the FWA device relative to each mobile network in one or more locations where the FWA device is placed using each corresponding SIM; present the operating characteristics of the FWA device relative to each mobile network via the mobile device, allowing a user to view each network's characteristics separately, the operating characteristics being ranked based on the one or more locations at which the FWA device is operating; and provide guidance regarding optimal placement of the FWA device based on the ranking of the measurements.

In some embodiments, the operating characteristics are determined by one or more performance measurements.

In some embodiments, the mobile device further comprises an external antenna accessory and the memory unit's computer code, when executed, further causes the processor to provide guidance regarding at least one of mounting the external antenna accessory in a certain orientation or adjusting the orientation of the external antenna accessory on the mobile device.

In some embodiments, the memory unit's computer code, when executed, further causes the processor to determine whether the external antenna produces an improved throughput and notifies the user if the connection worsens.

In some embodiments, the memory unit's computer code, when executed further causes the processor to display a speedometer that measures the strength of the mobile network and displays the strength in real time.

In some embodiments, the speedometer is accompanied by a separate compass that determines the direction of a relevant cell tower.

In some embodiments, the memory unit's computer code, when executed further causes the processor to save each network and their relative strengths and generate a heat map of the saved locations using GPS coordinates.

In some embodiments, the memory unit's computer code, when executed further causes the processor to receive the GPS coordinates from a user input.

In some embodiments, the rankings are displayed according to a hierarchy that incorporates the relative signal strengths of 5 G and 4 G networks.

In some embodiments, the memory unit's computer code, when executed further causes the processor to alternate between using 5 G and 4 G networks depending on the needed coverage.

In accordance with another embodiment, a method of determining placement of a 5 G fixed wireless access (FWA) device may comprise: determining operating characteristics of the FWA device upon connecting to one or more 5 G cells using each of a plurality of subscriber identity modules (SIMS); displaying the connection strength of each cell at one or more locations; ranking the connection strength of each cell at each of the one or more locations; presenting a list of the rankings to a user and allowing the user to select a location and cell; providing guidance instructing a user to place the 5 G device at the selected location and connecting to the selected cell; and displaying the connection strength at the chosen cell and location with a dynamic display that updates in real time.

In some embodiments, determining operating characteristics includes obtaining one or more performance measurements.

In some embodiments, the method further comprises taking a photograph of each location that is ranked and displaying the photograph of each location with the ranking.

In some embodiments, displaying the connection strength of each cell at each location involves a visual representation of a speedometer with an arrow that changes as the user moves the device.

In some embodiments with a speedometer, the method further comprises connecting to a different cell and changing the speedometer to display the connection to the new cell.

In some embodiments, the method further comprises presenting guidance instructing a user to rotate the 5 G device and determining what orientation optimizes connection.

In some embodiments, the method further comprises displaying a heat map for each cell based on the GPS coordinates of each measured location.

In some embodiments, the rankings comprise at least one of a numerical ranking or a written statement as to the location's strength.

In some embodiments, the method further comprises presenting guidance instructing a user to mount an external antenna and guiding the user on locating the optimal location for the antenna using a signal strength speedometer.

In some embodiments, the method further comprises determining whether the antenna improves the connection and disconnecting the antenna if connection worsens.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
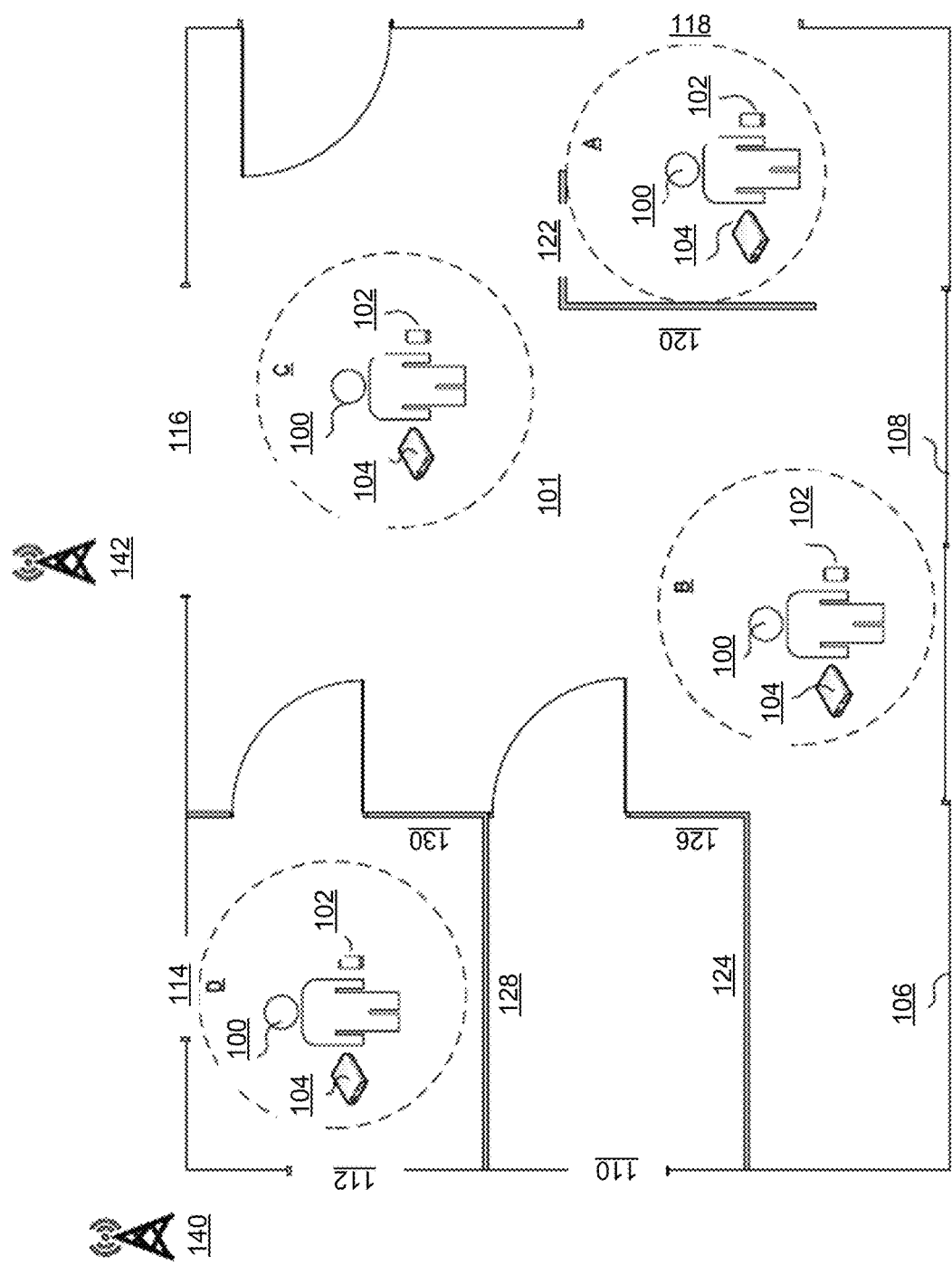
FIG. 1 is a schematic representation of an example FWA device operatively communicating with two 5 G smart cells and one mobile device for effectuating self-installation in accordance with one embodiment of the present disclosure.

The figures are not exhaustive and do not limit the present disclosure to the precise form disclosed.

DETAILED DESCRIPTION

The proper or optimal location/orientation of a FWA device can be an important factor to the success of using a FWA device. In accordance with various embodiments, a self-installation application may be provided to users to assist with installation of a FWA device. The self-installation application may provide a convenient user interface by which users are guided through various steps to determine an optimum location/orientation for installing a FWA device. The self-installation application may be executed on a mobile device. The user may traverse one or more areas with the FWA device and the mobile device running the self-installation application. The FWA device may determine signal strength or take/derive other measurements indicative of connection quality to one or more 5 G cells with which the FWA device may connect to effectuate wireless broadband service. It is important to note that while the FWA may have 5 G capabilities, it may also have 4 G/LTE capabilities to facilitate a strong connection with networks that have not implemented 5 G capabilities. As discussed in further detail below, the FWA device can also evaluate the connection quality of 4 G cells simultaneously with available 5 G networks. The FWA device can determine whether either network has a stronger connection, regardless of whether the network has 5 G or LTE capabilities. All information can be relayed to the user by way of the self-installation application so that the user can be made aware of locations/orientations that may be appropriate for installation of the FWA device. Moreover, the self-installation application may run diagnostic tests such as determining signal strength, signal quality, performance rating, actual throughput (upload/download speed) and/or latency associated with such locations/orientations to again, assist a user in determining optimal placement of the FWA device.

It should be understood that some embodiments described herein are presented in the context of an end-user self-installation application. However, the guided installation can also be applied in other contexts and/or for other users. For example, professional installers may leverage the disclosed functionality (or a subset thereof) to facilitate installation of a FWA device on behalf of end-users, such as consumer end-users. That is, a consumer end-user may be presented with more detailed instructions/guiding steps and/or more simplistic instructions, for example. On the other hand, a professional installer may still benefit from location surveying/optimized location/orientation estimations and the like that various embodiments can provide, albeit with less instruction, e.g., less guided steps may be presented, or certain steps can be assumed to be performed by the professional installer, and guided step screens can be skipped or bypassed. In some embodiments, the information/guidance presented by the self-installation application can differ depending on the user.

The present disclosure also describes use of a dual subscriber identity module (SIM) in some embodiments. A SIM, typically in a "card" form, is an integrated circuit intended to store the international mobile subscriber identity (IMSI) and its key. SIM cards can store other network-specific information used to authenticate and identify subscribers on the network, such as the integrated circuit card identifier (ICCID), local area identity (LAI), and operator-specific emergency number. Information that can be stored in a SIM can include phone numbers, security data, and contact information.

Traditionally, mobile devices relied on a single SIM to communicate with particular networks. The use of a single SIM allows a user to connect to one particular network at a time. While useful, a single SIM has limited capability to evaluate multiple networks. The introduction of the dual SIM space enables a user to evaluate multiple networks simultaneously. Dual SIM phones are popular for separating personal and business calls, and allow a user to use multiple service carriers to choose a different network when one carrier carries a weak connection in a particular area. With the use of one or more SIM, the user can facilitate a network connection for each available SIM and efficiently evaluate all nearby networks to determine an optimal connection.

Accordingly, various embodiments comprise a self-installation application that can be used for a dual subscriber identity module (SIM) device. The self-installation application used in a dual SIM context allows the user to test the RF performance of two separate mobile networks on a single FWA device. Use of the self-installation application guides the user to take, e.g., network measurements associated with both SIMs, switches between SIMs dynamically, then ranks and summarizes the results for each location and SIM measurement. As discussed in more detail below, users can view the real-time signal strength on each network. While monitoring this signal strength, users can run diagnostic tests through the self-installation application such as determining signal strength, signal quality, performance rating, actual throughput (upload/download speed) and/or latency associated with such locations/orientations for two networks simultaneously, allowing a user to view the characteristics of two separate networks to, again, assist a user in determining optimal placement of the FWA device. The diagnostic tests can also be initiated automatically without prompting. These diagnostic tests can be displayed to the user in real time, allowing for the user to receive quick updates as to the status of a particular network. In other embodiments, these diagnostic tests can also be used to dynamically change the network settings on the device. For example, if the data usage on primary SIM is exceeded, the application may automatically switch to a secondary SIM. In another example, if the signal strength drops below a user-configurable value, the application may automatically initiate a switch to the secondary SIM. This may further optimize the user experience as the user will not need to focus on a particular network to determine whether a network change is needed.

In some embodiments, first and second SIMs of a dual SIM device are capable of communicating with both 5 G and 4 G networks, one SIM supporting one type of network. It should be understood that it is possible that SIMs are associated with different providers/services over the same/same type of network, although examples described herein are presented in the context of 5 G/4 G interoperability. That is, as 5 G networks are still in the beginning stages of expansion, it is important to recognize that areas may have a mixture of 5 G and 4 G networks, or may consist solely of 4 G networks. The 4 G/LTE support in this FWA device allows a user to locating an optimal LTE location just as the device is capable of finding an optimal 5 G location. When there is a mixture of available networks, the FWA device may alternate between LTE and 5 G connections depending on the network loading and demands. The self-installation application can intelligently compare 4 G and 5 G networks simultaneously based on a uniform rating scale. Furthermore, a hierarchy is implemented that allows a user to select a 4 G/LTE network if the connection is stronger than the available 5 G networks. The FWA and self-installation application can intelligently determine whether a 4 G network provides a better connection than an available 5 G network. This dual capability provides users with an efficient installation process with improved results.

The self-installation application can also intelligently format its display and installation process based on the particular user. In some embodiments, the self-installation application may initially request self-identification from a user as either a consumer user or a professional user. In some embodiments, the user may enter a provided code or identifier to inform the self-installation application. In some embodiments, the flow or sequence of guidance/presentation of steps or information can adapt depending on user responses or input. For example, in some embodiments, options may be presented to a user via the self-installation application user interface to bypass or skip certain screens or information. If such options are leveraged, the self-installation application may assume a professional or more experienced user is performing self-installation of a FWA device, and thus, may adapt information/guidance that is presented thereafter. In some embodiments, the user may determine what location(s)/orientation(s) to try. In some embodiments, the self-installation application may provide at least some direction or guidance, e.g., cues, to the user. Guidance can be provided via graphics, textual cues, audio/visual communications/notifications on one or more devices, e.g., a mobile device, a cloud-based interactive application/mechanism, and the like.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. In the context of the present disclosure, optimal may be used to describe a location, orientation, or positioning of a FWA device that provides a desired level of service or connection quality. In some embodiments, the optimal location, orientation, or positioning of a FWA device may be realized relative to a threshold for such a level of service or connection quality. In other embodiments the optimal location, orientation, or positioning of a FWA device may be the best out of some set of locations, orientations, or positions.

In still other embodiments, the self-installation application alluded to above may be enhanced with or may be part of a broader device management suite of tools/applications that can be implemented via a Web Browser-based user interface (UI), a mobile device application, and/or a cloud-based software service. In accordance with some embodiments, subsequent to installing a FWA device, a device management application or function/tool provided with or in addition to the self-installation application may be used to monitor operating characteristics of the installed FWA device, and/or manage one or more aspects of the operating characteristics of the installed FWA device. In some embodiments, the device management functionality of such applications/tools may be utilized prior to or during the self-installation process.

The device management and self-installation applications may be different aspects of a single mobile device application. In some embodiments, they may be separate mobile device applications, where relevant information regarding the installed FWA device can be passed to the device management application. In some embodiments, a user may monitor and/or manage an installed FWA device via a direct connection between a computer-hosted web UI and the installed FWA device. In some embodiments, a user may monitor and/or manage the installed FWA device via one or more cloud-based applications/interfaces. In some embodiments, one or more of the aforementioned cloud-based service(s), direct web UI(s), and mobile device application(s) may share relevant information and/or interoperate such that a user may move between one or more of the service(s), UI(s), application(s) to provide continuous/consistent functionality across all platforms. It should be understood that in some embodiments, one or more of the above-described applications or tools may be used to monitor and/or manage multiple installed FWA devices (as well as end user or client devices/user equipment) operatively connected to the one or more installed FWA devices.

Before describing the details of the various embodiments contemplated herein, it would be beneficial to describe a 5 G network to which the aforementioned FWA device may connect. A mobile network can be thought of as comprising two component networks, the Radio Access Network (RAN) and the core network. A mobile network's RAN may include various infrastructure, e.g., base stations/cell towers, masts, in-home/in-building infrastructure, and the like. The RAN allows users of mobile devices (also referred to as User Equipment (UE), e.g., smartphones, tablet computers, laptops, vehicle-implemented communication devices (e.g., vehicles having vehicle-to-vehicle (V2V) capabilities), to connect to the core network.

Macro cells can refer to (tall, high-powered) "macro" base stations/cell towers that are able to maintain network signal strength across long/large distances. 5 G macro cells may use Multiple Input, Multiple Output (MIMO) antennas that may have various components that allow data to be sent and/or received simultaneously. The MIMO antennas used by 5 G macro cells may comprise large numbers of antenna elements, which can be referred to as massive MIMO, whose size may be comparable to, e.g., 3 G and/or 4 G base station antennas. 5 G small cells can refer to wireless transmitters/receivers implemented as micro base stations designed to provide coverage to areas smaller than those afforded coverage by 5 G macro cells, e.g., on the order of about 100 m to 200 m for outdoor 5 G small cells. Indoor 5 G small cell deployments may provide coverage on the order about 10 m. 5 G small cells can be mounted or integrated into/onto streetlights, utility poles, buildings, etc., and like 5 G macro cells, may also leverage massive MIMO antennas.

The core network may comprise the mobile exchange and data network used to manage the connections made to/from/via the RAN. The core network of a 5 G network may include a central server and a local server. The use of distributed servers can improve response times, thereby reducing latency. The core network may leverage network function virtualization (instantiation of network functions using virtual machines via the cloud rather than hardware) and network slicing (segmentation of a 5 G network in accordance with a particular application, industry, or other criteria) to provide these lower response times, and provide faster connectivity.

Some embodiments include a wired network implemented using a wired communications medium. In some embodiments, the wired communications medium may be a fiber optic cable system, an Ethernet cable system, a coaxial cable system, a power line system, or other physical communications medium. In one embodiment, a wireless access point is included to provide a wireless network over which various devices may communicate wirelessly. For example, the wireless access point can function as a Wi-Fi router to create a Wi-Fi network over which the various devices can communicate. In this example, the wireless access point can also include a router so that it can communicate over a wired communications medium. A number of devices can communicate wirelessly or over wired communications mediums as devices on the network. Some examples include a smart phone, a smart TV, and personal computers that can communicate wirelessly with the wireless access point. In some embodiments, a router can communicate with the wireless access point via the wired communications medium. This router can further communicate with a set-top box, a television, and a gaming console via a wired communications interface. In some implementations, the wireless access point may be implemented as a Wi-Fi router for communications with devices within or within some proximity. Although various embodiments may be described, the technology disclosed herein can be implemented in any of a number of different environments.

Referring now to FIG. 1, a floorplan of a structure 101 is illustrated, which may be a house, apartment, residential, commercial, government, or other building or facility in which a user may wish to install a FWA device. As will be described in greater detail below, a user may execute a self-installation application on his/her mobile device 102, where the mobile 102 can be communicatively linked or paired to a FWA device 104 to be installed somewhere about floorplan 101. 5 G broadband coverage may be achieved by FWA device 104 upon being operatively connected to any of a plurality of 5 G cells, such as cell 140 and cell 142.

As described above, when relying on a 5 G small cell to achieve 5 G broadband coverage, the location and orientation of a FWA device relative to the 5 G small cell is an important consideration because mmWave and high-band sub-6GHz signals are significantly attenuated by wall and window materials, may experience air loss, etc. In accordance with various embodiments, the self-installation application relays information from FWA device 104 to user 100 so that user 100 can determine, with assistance from the self-installation application, optimal placement of FWA device 104. As illustrated in FIG. 1, user 100 may traverse structure 101 with both mobile device 102 and FWA device 104. As the user traverses different areas within or about structure 101, the self-installation application running on mobile device 102 measures the connection between the FWA device and up to two cells simultaneously, e.g. 140/142. The application can present information such as signal strength, may run diagnostic tests, such as performance rating, upload speed, download speed, and/or latency times associated with locating and/or orienting FWA device 104 in a particular area. The user can toggle separate pages to quickly change the display to view the diagnostics of either cell 140 or second cell 142.

As an example, FIG. 1 illustrates user 100 in a first location "A" between outer wall 106 of structure 101 and interior walls 120 and 122, and proximate to a window 118. At this location A, user 100 may command the self-installation application running on mobile device 102 to initiate (or it may automatically initiate) testing to determine the quality of the 5 G broadband coverage received or experienced by FWA device 104 at that location from both 5 G small cell 140 and 5 G small cell 142.

For example, FWA device 104 may attempt to initiate connections to 5 G small cell 140 and small cell 142. It should be noted that FWA device 104 may first undergo an authentication and/or authorization process with 5 G small cell 140. Thereafter, FWA device 104 may begin receiving signals from 5 G small cell 140 and 5 G small cell 142, and the FWA device 104 can begin measuring the strength of the signals being received. In some embodiments, signal strength can be measured in dBm. A wireless receiver of the FWA device 104 may receive such signals via an antenna, and determine the associated signal strength.

For example, FWA device 104 may measure the Reference Signal Received Power (RSRP) Reference Signal Received Quality (RSRQ), Signal to Interference Plus Noise Ratio (SINR) parameters of a reference signal from both 5 G small cell 140 and 5 G small cell 142. The signal strength can be translated into and presented as a graphical indication that the user may understand, e.g., graphical bars or other indications reflecting an approximate representation of signal strength. Such graphical indications can be presented by way of the self-installation application running on mobile device 102.

Additionally, the self-installation application may further perform diagnostics, e.g., determine upload speeds, download speeds, latency, and/or qualitative performance rating. One skilled in the art would understand how to implement the requisite functionality on FWA device 104. This information could also be graphically or visually presented to the user via the self-installation application. In this way, the user can be made aware of any information relevant to the strength of the signal(s) received from 5 G small cell 140, and the user can understand the relative strength/weakness of locating/orienting FWA device 104 in that particular area. It should be noted that 4 G and 5 G services may co-exist, e.g., 4 G base stations/cells may be present in the same/nearby geographical area(s) in which 5 G service is provided. If some embodiments, if both 4 G and 5 G network capacity is available, the connection strength between both networks will be evaluated and ranked according to a hierarchy that incorporates both 5 G and 4 G networks. Furthermore, if multiple cells are evaluated, each cell can be compared to the other and ranked accordingly, creating a ranking that incorporates multiple networks and multiple locations/orientations. Higher ranking network and location combinations will then be chosen. In one example, the ranking is as follows:

1: (5 G-4) 2: (5 G-3) 3: (LTE-4) 4: (5 G-2) 5: (LTE-3) 6: (5 G-1) 7: (LTE-2) 8: (LTE-1)

The FWA device and/or the self-installation application via the FWA device will assess the signal characteristics, and make a quantitative determination to translate the signal characteristics into an appropriate number of representative signal bars (e.g., one to five bars) to display within the self-installation application. Similarly, a performance ranking will be assigned based on an appropriate number of stars (e.g. one to five stars). This performance ranking provides a more precise, signal strength quality and performance representation in one location/orientation relative to another.

As described herein, location and orientation can both be taken into account when considering optimal positioning of a FWA device relative to a 5 G small cell/gNB. Accordingly, in some embodiments, the self-installation application may, e.g., by audible prompts or signals, visual prompts or signals, or some other type of prompt/signal or combination thereof, inform the user of the relative performance differences and/or suggestions regarding location and/or orientation of a FWA device. For example, in one embodiment, the application will use a speedometer display that updates as the user traverses the area. For professional users, this speedometer can update with RSRP measurement values as opposed to a general measurement of connection strength. In other embodiments, a user may be directed through other directions/notifications (e.g., separate documentation) to position the FWA device in different locations/orientations at a particular location. In some embodiments, resident navigational functionality (GPS, compass, etc.) of a mobile device may be used by the self-installation application to determine location/orientation. In some embodiments, potential locations/orientations may be presented on a graphical map along with associated predicted/estimated performance ratings at those locations/orientations. For example, a user may be directed to position the mobile device on which the self-installation application is running near the FWA device, and point or orient the mobile device in a particular direction that is indicative/representative of the direction/orientation in which, e.g., a front face of the FWA device is directed/oriented to achieve a "baseline" orientation. Similarly, in some embodiments, a map may be created after the user traverses the area. As the user moves, measurements are taken at various points and are then presented as a heat map display. This allows the user to pinpoint an area that consistently makes a better connection. In some embodiments, location-based functionality may be implemented and leveraged in the FWA device itself. It should be understood that these are examples and not meant to be limiting.

As further illustrated in FIG. 1, user 100 may explore other areas for the potential placement of FWA device 104, for example: location B, proximate to sliding glass door 108 and within a generally "open" area near the center of structure 101; location C, proximate to window 116, but north of location B; and location D in a room bounded by outer wall 106, interior walls 128, 130 with windows 112, 114 along outer wall 106. It should be noted that while some examples discussed herein refer to indoor locations, embodiments can be used or applied for outdoor installations as well, e.g., on a roof, along an external periphery of a building, etc. In such scenarios, outdoor obstructions or elements may be considered when determining preferred/optimal location/placement/orientation of FWA device 104, e.g., leaves, trees, branches, other structures, etc. It should be appreciated that the signal strength of signals from 5 G small cell 140 received by FWA device 104 depending on its location/orientation within/proximate to structure 101 can vary based on the presence of windows, walls, doors, the thicknesses/materials thereof, line of sight angle, etc. For example, it can be appreciated that the received signal strength at location A will likely be less optimal than that at location D due to location A having interior walls (120 and/or 122), wall 130, and outer wall 106 that signals must pass through. This is in contrast to location D, where signals may only have to pass through outer wall 106, and possibly only through one of windows 112 or 114.

Figure 2:
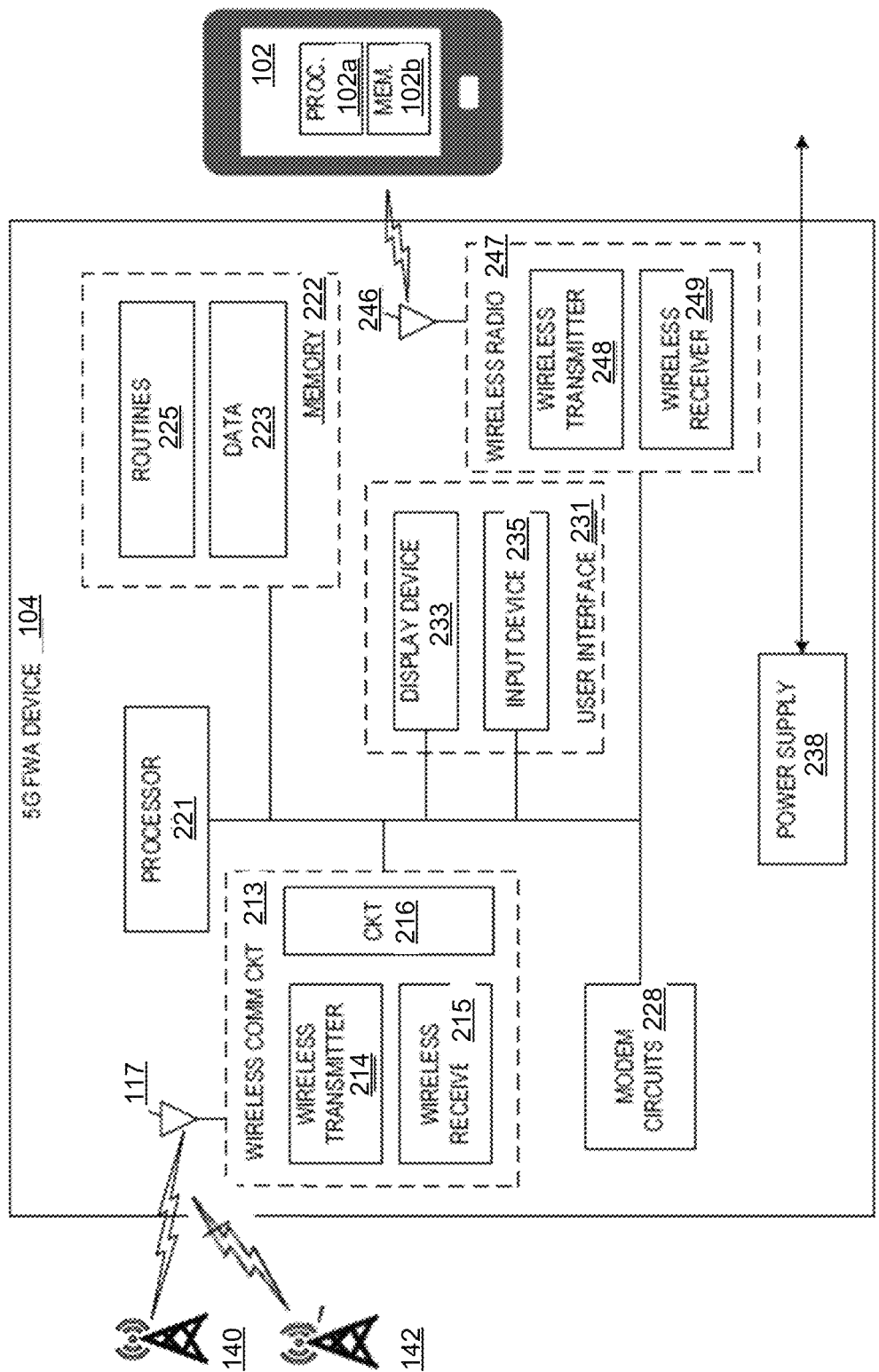
FIG. 2 illustrates the transmissions from the 5 G cells and the mobile device.

In some embodiments, mobile device 102 may have a processor 102a and a memory unit with which a self-installation application can be implemented. As shown in FIG. 2, one embodiment of device 104 includes a processor 221, memory 222, modem circuits 228, power supply circuits 238, and a 5 G wireless communication circuit 213. In some embodiments, FWA device 104 may also include user interfaces in the form of a display device 233 and an input device 235. In some embodiments, FWA device 104 may be adapted to store the above-described self-installation application in memory 222, and a processor 221 may execute the self-installation application. In this way, the need to use mobile device 102 as a mechanism for relaying data, e.g., signal strength data, between FWA device 104 and user 100, may be negated. For example, user 100 may traverse one or more areas of structure 101 with only FWA device 104, where FWA device 104 internally executes the self-installation application, and provides the requisite signal strength information, diagnostic information directly to user 100.

Processor 221 may be implemented as a dedicated or general-purpose processor or combination of processors or computing devices to carry out instructions and process data. Processor 221 may be dedicated to 5 G networks in combination without another processor with 4 G capabilities, so as to facilitate the dual-network capability. This can also be reflected in the routines 225. For example, routines 225 may include routines to measure received signal strength of signals received from FWA device 104 and/or run diagnostics, such as determining upload/download speeds and latency, or assigning a performance rating based on multiple signal/channel parameters. While routines 225 measure the received strength of signals, they can also incorporate routines to rank 5 G and 4 G networks simultaneously. The routines 225 may preset a ranking, or can intelligently determine a ranking based on the perceived strength of the networks. That information may be stored as data/as part of data 223. In some embodiments, routines 225 may include routines to automatically and periodically perform such measurements and/run such diagnostics. Routines 225 may include routines for responding to commands/instructions received from the self-installation application regarding when to initiate measuring of received signal strength. In some embodiments, routines 225 may include routines to transfer such received signal strength measurement information to wireless radio 247 to be transmitted to the self-installation application running on mobile device 102.

In an embodiment where the self-installation application is executing on FWA device 104, routines 225 may comprise routines for transferring, e.g., received signal strength information and/or processing such received signal strength information into visual and/or auditory data that can be presented to user 100 via user interface 231. Such visual and auditory data is capable of providing the user with information relevant diagnostics, such as signal strength, signal location, signal type (whether 4 G or 5 G), and more. In such embodiments, user 100 may input certain information and/or commands via user interface 231, wherein some or more of the input information and/or commands may be sent to memory 222 and used/incorporated into routines 225 for controlling or managing one or more operational aspects of FWA device 104. In some embodiments, routines 225 may include routines effectuating operative connectivity and interactions with self-installation application running on mobile device 102 or running on FWA device 104 itself. For example, the self-installation application may require user 100 to scan a code, e.g., a QR code, or input identification information associated with FWA device 104. In some embodiments, routines 225 may include routines for periodically or aperiodically saving measurement and/or diagnostic information as a log, cache, buffering such information, etc.

In still other embodiments, routines 225 may comprise routines for directing users to traverse an area, e.g., structure 161, randomly or in some other directed fashion, so that RSRP/diagnostics measurements may be taken with which an RSRP heat map can be generated. Accordingly, routines 225 may comprise routines to generate such an RSRP heat map (or multiple RSRP heat maps), and present the RSRP heat map to user 100. This heat map can be applied regardless of the type of network measured, as the RSRP heat map can generate 4 G and 5 G RSRP values respectively. In this way, user 100 may be provided with at least an initial "overview" of the structure 101, and can attempt locate/orient FWA device 104 optimally.

In some embodiments, routines 225 may comprise routines to access Geographic Information Systems (GIS) data from one or more GIS data repositories. Such GIS data may be used on its own to generate a gNB heat map and/or may be used to augment the aforementioned RSRP heat map. In some embodiments, routines 225 may comprise routines that estimate an area (e.g., one or more sides) of a location, such as structure 101, that is likely to get the best or better 5 G performance by virtue of the surrounding environment (as alluded to above) and the location(s) of nearby 5 G small cells. This geographic data can also determine whether the area is either not capable of 5 G connection or dominated by 4 G networks. Using this data, the self-installation application can avoid guiding a user to a 5 G network if it is too far away, either based on a set geographic distance or through the strength of the RSRP values. The generation and presentation of the gNB heat map may be similar to that of an RSRP heat map. It should be understood that the self-installation application may access information repositories maintaining information regarding the location of 5 G small cells, e.g., from mobile network operators (MNOs) or other entities having such information.

In some embodiments, routines 225 may comprise routines to present RSRP and/or gNB heat maps in an augmented reality fashion. In other embodiments, routines 225 may comprise routines to present RSRP and/or gNB heat maps or information regarding/relevant thereto may include but are not limited using voice assisted mechanisms, e.g., leveraging mobile device-resident functionality. In still other embodiments, routines 225 may include routines to effectuate one or more interfaces using audible tones, beeps, and the like. In some embodiments, the use of such interfaces or input/output mechanisms may avoid the need for a user to view information on a mobile device, instead being guided/being presented information via audio.

Processor 221 may include one or more single core, dual core, quad core or other multi-core processors. Processor 221 may be implemented using any processor or logic device, such as a Complex Instruction Set Computer (CISC) microprocessor, a Reduced Instruction Set Computing (RISC) microprocessor, a Very Long Instruction Word (VLIW) microprocessor, a processor implementing a combination of instruction sets, or other processing device. Other modem circuits 228 may be provided to perform other modem functions.

Memory 222 includes memory locations for storing instructions or other routines 225 and data 223. Memory 222 may be implemented using any machine-readable or computer-readable media to store data and instructions, including volatile and nonvolatile memory. Memory may be implemented, for example, as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory or other solid state memory, polymer memory, ferroelectric memory, Silicon-Oxide-Nitride-Oxide-Silicon (SONOS) memory, holographic or other optical storage, or other memory structures. Part or all of memory 222 can be implemented on the same integrated circuit as processor 221 or otherwise form part or all of embedded memory of processor 221.

Wireless communication circuit 213 includes a wireless transmitter 214, a wireless receiver 215, communication circuitry 216 and antenna 217. Communication circuitry 216 may be implemented as a communications processor using any suitable processor logic device to provide appropriate communications operations such as, for example, baseband processing, modulation and demodulation, and other wireless communication operations. Where certain operations such as modulation and demodulation are performed in the digital domain, analog-to-digital and digital-to-analog conversion circuitry can be included to provide the appropriate interfaces between communication circuitry 216 and wireless transmitter 214 and wireless receiver 215.

In some embodiments, the FWA device 104 incorporates a user interface 131, which may include a display device 133 and an input device 135. Display device may include, for example, one or more LEDs; display screens, touch screens, or other alphanumeric displays, or other display devices to communicate data or other information to a user. Input device 135 may include buttons, a keypad, a touchscreen display, or other input device to accept input from a user. For example, in some embodiments, voice commands from user 100 may be used to control the self-installation application (if being executed on FWA device 104), and/or audio prompts or other information regarding, e.g., information that might otherwise (or in addition) be presented visually, can be provided to user 100. Display device 133 and input device 135 may include attendant circuitry such as drivers, receivers and processing or control circuitry to enable operation of the devices with FWA device 104.

Power supply circuit 238 can be included to provide power conditioning or power conversion for components of FWA device 204. For example, power supply can supply power to different components of FWA device 204 at specific voltage and current levels appropriate for those components. Power supply circuit 238 in this example, may receive power from a wired or wireless power source operatively connected to FWA device 104. In some embodiments power supply 238 may be a battery power supply. In some embodiments, power supply 238 may be Power-over-Ethernet (PoE), where power can be carried over Ethernet wires (IEEE 802.3 bt), where in some embodiments a PoE power injector can be built into a connected router/gateway, or can be a separate component with an AC adaptor that can be connected to the building mains. As alluded to above, user 100 may traverse one or more areas of structure 101 to determine received signal strength at FWA device 104. Accordingly, FWA device 104 must be powered on and operative. Therefore, user 100 may connect an external power supply, such as an external battery pack (not shown in FIG. 2). Alternatively, FWA device 104 may be connected to a power outlet (not shown in FIG. 2) of structure 101, for example, and user 100 may be able to traverse certain areas while FWA device 104 is plugged in to such a power outlet.

Figure 3A:
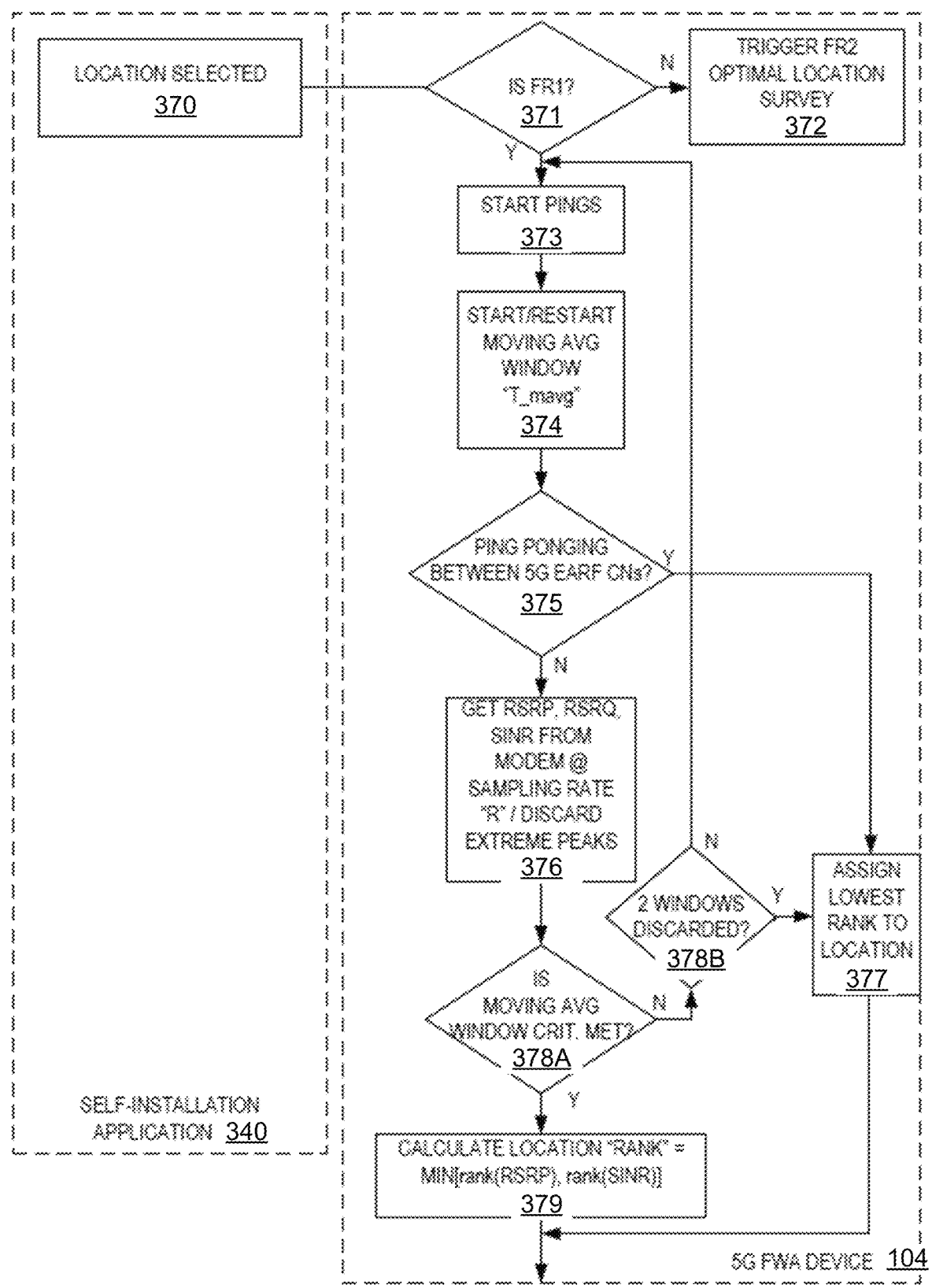
FIG. 3A is a flow chart illustrating example operations performed during a first frequency range fine measurement phase in accordance with one embodiment of the present disclosure.
Figure 3B:
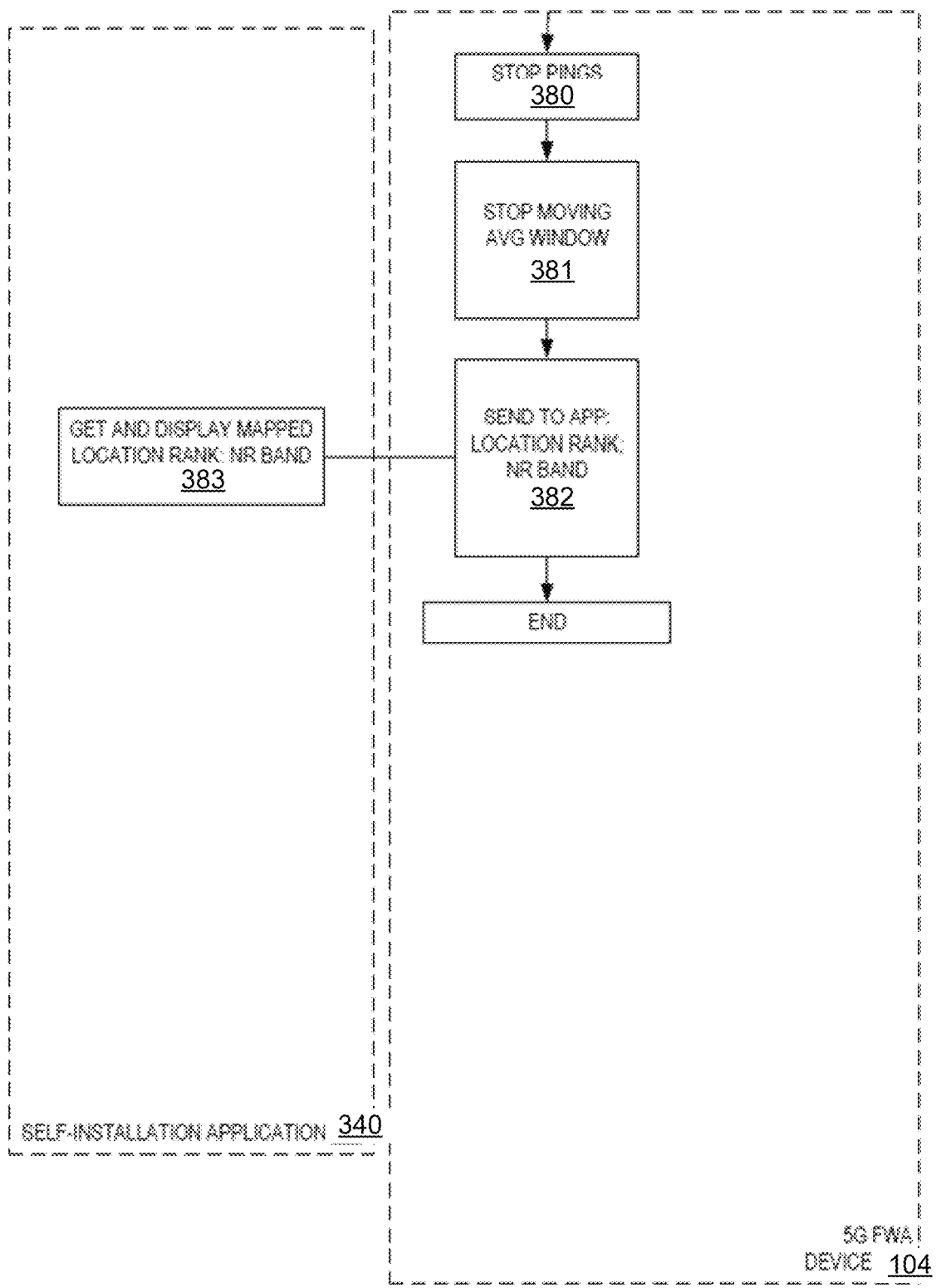
FIG. 3B is a continuation of the flow chart of FIG. 3A.

FIGS. 3A and 3B illustrate example operations that may be performed during a fine measurement phase in a first frequency range (e.g., which can correspond to FR1) corresponding to one particular network. The processes in FIGS. 3A and 3B are repeated for a second network to be displayed, with the endpoints of both processes being displayed on separate pages in the self-installation application. Each process is evaluated on one SIM, with a provided ranking. Afterwards, the process evaluates a second network using the second SIM. In some embodiments, all SIM cards evaluated are with the same type of network, i.e. all 5 G or all 4 G networks. In some embodiments, one or more SIM cards may be associated with a first type of network while one or more other SIM cards are associated with another network. As further discussed below, each situation can affect the later operations illustrated in FIG. 3A. At operation 370, upon selection of a location, a check is performed to determine whether the frequency range in use is FR1 at operation 371. If not, an FR2 optimized location assessment may be triggered at operation 372. If so, FWA device 104 may begin pinging the cell/BS to which it is attached at operation 373. At operation 374, a moving average window of length (duration) T_mavg is started/restarted. RSRP and SINR can be sampled at a sampling rate of "R" Hz within this window, and RSRP and SINR averages are calculated within this window as well. Extreme peaks for SINR and RSRP can be discarded during the averaging process. A window with a high standard deviation, or a high channel switch frequency can be discarded. At operation 375, a check for ping ponging between 5 G EARF CNs is performed, e.g., when a device/user equipment switches between networks attaches to different 5 G EARF CNs and/or due to device/user equipment handovers between multiple 5 G EARF CNs. If the ping pong effect is occurring, at operation 377, a lowest rank is assigned to the location. At operation 376, the RSRP, RSRQ, and SINR measurements are obtained from the modem of FWA device 104 at a given sampling rate and extreme peak measurements are discarded (to rid, e.g., anomalous measurements, from the dataset comprising signal strength measurements). For example, the SINR/RSRP measurement or reading can be discarded if $SINR\_current - SINR\_previous > \pm V\_sinrFR1$ and/or $RSRP\_current - RSRP\_previous > \pm V\_rsrpFR1$, where V refers to a constants value.

At operation 378A, a check is performed to determine if the moving average window criteria is met. In particular, a moving average window may be discarded, and a new one started if standard deviation $(SD)\_mavgwin\_SINR > SD\_sinrFR1$ AND $SD\_mavgwin\_RSRP > SD\_rsrpFR1$. A moving average window may also be discarded if the 5 G EARFCN switch frequency exceeds a threshold i.e., $f\_5gearfcn >= F\_5\ GEARFCN$. It should be noted that if more than two moving average windows are discarded (checked at operation 378B), the lowest RF ranking can be assigned to the corresponding location. Likewise, if ping ponging occurs between 5 G EARF CNs within a moving average window, the lowest RF rank can be assigned to this location. It should be noted that if there are multiple locations/orientations "tied" as having the same RF rank, the location with the higher average RSRP is ranked higher. It should also be understood that different ways of ranking, breaking ranking ties, etc. may be implemented. For example, different metrics/criteria for breaking ties between measured RF characteristics can be applied to different rankings ties. For example, lowest RF rank ties may be broken using a first tie-break metric, whereas a highest RF rank tie may be broken using a second tie-break metric. One of ordinary skill in the art would understand how to perform such tie-breaks, and when to implement such tie-breaks.

At operation 379, if the moving average window criteria is met at operation 478, a location "rank" (which in some embodiments can equate to MIN[rank(RSRP), rank(SINR)]) can be calculated. This ranking incorporates 4 G and 5 G, such as in the example ranking listed above. An overall ranking on a preset scale is also provided, where this scale may be adjusted based on whether the network has 4 G or 5 G capabilities. In one embodiment, three or more sets of rankings are calculated, including but not limited to: a rank compared to other networks measured; a rank on a scale of one to five, with five being the optimal network; and an adjective describing the network's efficacy such as "Excellent", "Good", "Fair", etc. As illustrated in FIG. 3B, at operation 380, the pinging of the cell(s) can stop, the moving average window can be stopped at operation 381, and location rank and new radio (NR) band information can be sent to self-installation application 340 at operation 382, where this information can be obtained and displayed by self-installation application 440 to a user at operation 383. This information may also be saved for multiple locations and displayed in list format to show the rankings of each location in comparison to the other locations measured.

FIGS. 4A-4E illustrate various example screen shots of the disclosed self-installation application in accordance with various embodiments. Mobile device 102 is represented in FIGS. 4A-E as having a display through which various graphical/visual information, elements, instructions, commands, interactive features and the like may be presented. Although not shown, mobile device 102 is understood to have microphones, speakers, and/or other interactive elements through which information may be input, received, transmitted, or otherwise communicated. It should be understood that more or less operations may be part of the self-installation application, and that the illustrated screen shots are examples only, and not meant to be limiting in any way, nor is the order in which the screen shots are illustrated/described indicative of any set or requisite order that must be followed.

Figure 4A:
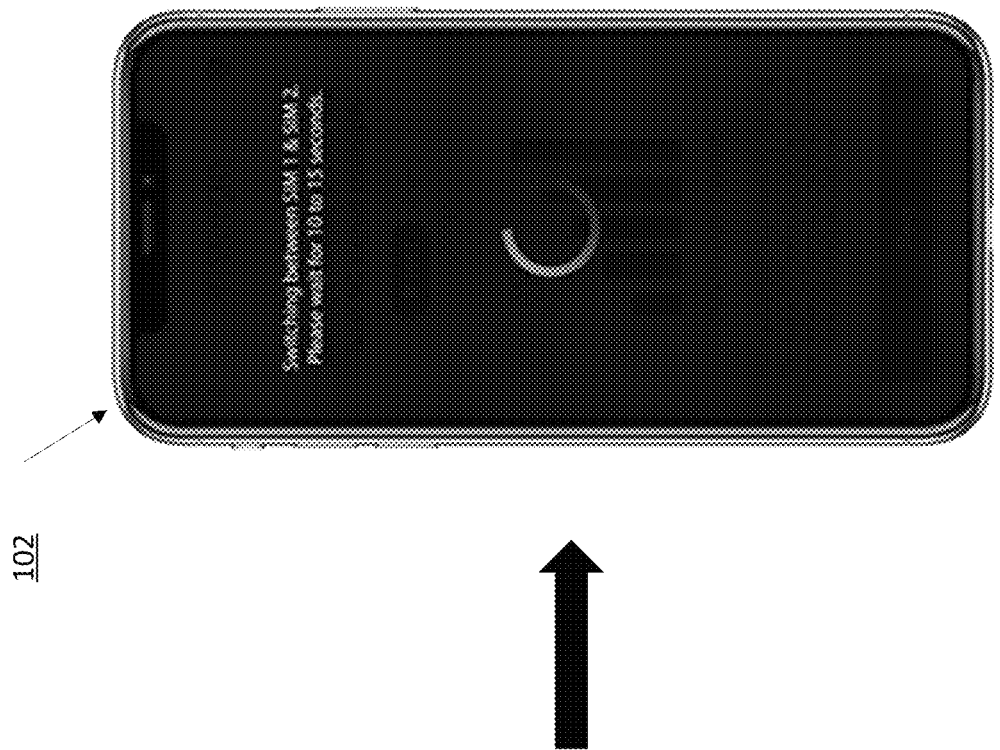
FIG. 4A illustrates example screenshots of an application used for self-installation of a FWA device.
Figure 4A:

FIG. 4A illustrates the display of the dual SIM capability. In some embodiments, a tab 102A allows the user to choose between SIM 1 and SIM 2 to use the dual SIM capability. The user is then capable of switching between networks to show a display that caters to the operating characteristics of that particular network. In some embodiments, the display contains a speedometer 102B, which can show the RSRP value and/or the general connection strength, depending on the user's preferences. This speedometer 102B updates as a user traverses a location, allowing the user to receive real-time measurements to determine the optimal location. In some embodiments, the FWA device may receive a particular gNB signal while displaying the speedometer. The display may include an indication of the particular cell tower transmitting the gNB signal. The speedometer display may also include a visual representation of a compass to show the direction of the connected gNB signal. This may assist the user in pointing the FWA device in a particular direction to minimize the number of locations surveyed. In one example, compass 102C can accompany the speedometer 102B on the same display. Compass 102C may comprise an arrow that points upward when the FWA device is pointing directly towards the relative cell tower, suggesting that a more optimal connection. This would allow a user to simultaneously determine the signal strength at a particular location while narrowing the number of locations that may be surveyed to determine a stronger signal strength.

Figures 4B, 4C, 4D:
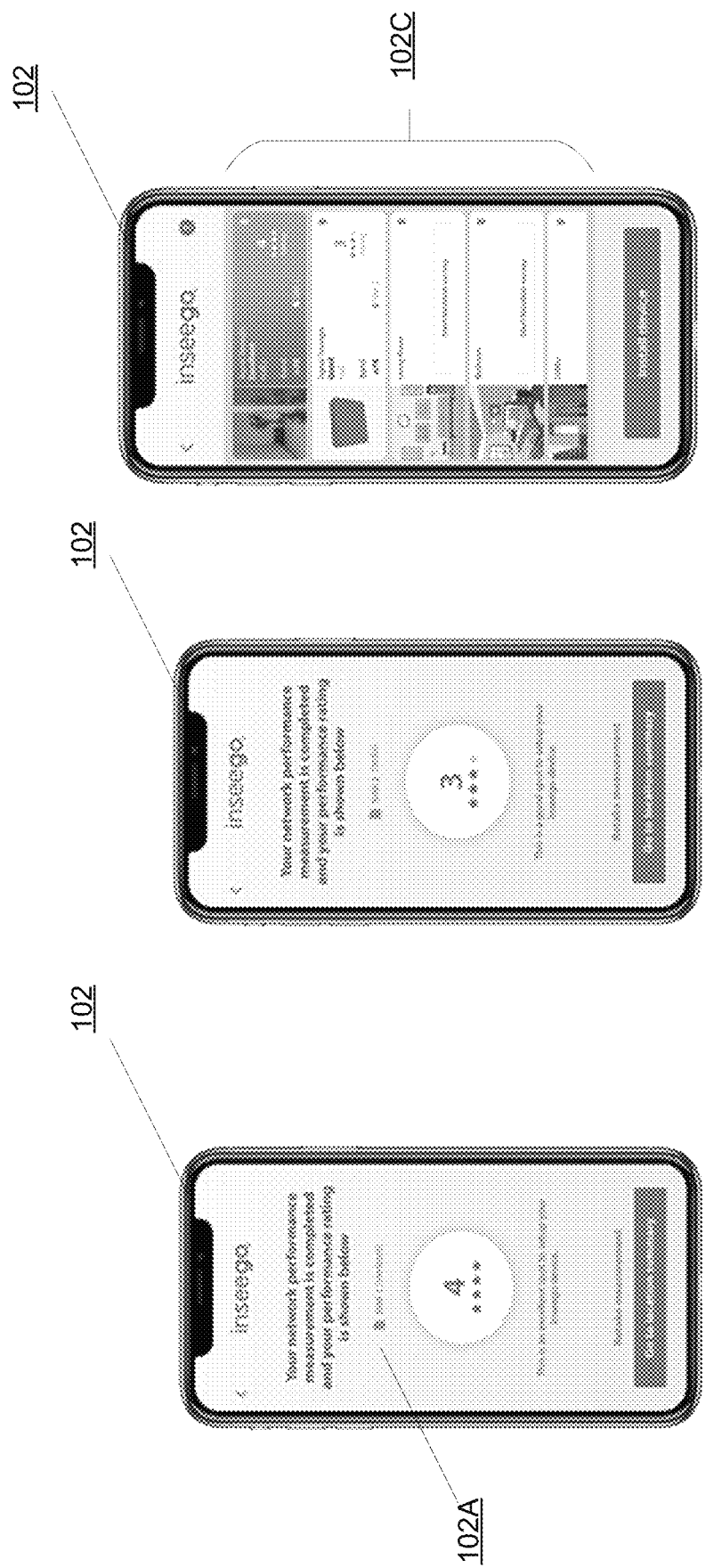
FIG. 4B-D illustrates still other example screenshots of an application used for self-installation of a FWA device.

FIG. 4B-D illustrates that various displays that allow a user to view the rankings of each location. There is a tab 102A that allows the user to switch to a separate SIM to immediately compare two different networks at any given location. Users can also view a location list 102C after measuring the connection at various different locations. Users are capable of uploading photographs to designate a particular location. For example, the self-installation application may prompt user 100 to use 100's resident camera to take a picture of the location, a picture from the perspective of where FWA device 104 is placed. In other embodiments, the self-installation application may automatically trigger the resident camera of mobile device 102 to take a picture, take video, etc. In some embodiments, self-installation application may provide the ability for user 100 to input any desired identifying or other information to be associated with the location and saved with the gathered received signal strength information and/or diagnostic information. These photographs are added to the display, showing a ranking that incorporates both networks and all of the locations measured.

The self-installation application may provide an interactive element to user 100 allowing user 100 to save the location and/or any related measurement/diagnostic information regarding the characteristic operation of FWA device 104 at that location. If user 100 chooses to save this location/information at this location, FIG. 5B further illustrates that a list of saved locations and/or any associated information/data, which can be presented to user 100. It should be noted that a user may choose not to save the location/data and/or may choose to retake measurements/rerun the diagnostic tests. For example, there may have been a temporary obstruction at the particular location, or the user 100 may choose to reorient the FWA device 104 to see if reorienting the FWA device 104 in the same location may result in better operating characteristics. This process can be repeated as often as user 100 may desire. In some embodiments, the self-installation application may comprise a learning algorithm that is capable of determining whether, over some period of time, over some subset of measurement and/or diagnostic data, that the user 100 will not likely find a better location and/or orientation for the FWA device 104, and may indicate as such to user 100.

In some embodiments, the self-installation application may be pre-loaded with information regarding 5 G and 4 G cells in the vicinity of the area(s) in which the user wishes to install the FWA device. Therefore, the self-installation application may recommend certain locations/orientations that have a greater potential of providing the requisite connection quality. In some embodiments, the self-installation application may leverage the location-based services or functionality resident on the user's mobile device to aid in determining an optimal or preferred location/orientation of the FWA device. For example, prior to or as part of initializing the self-installation application, user 100 may input or mobile device 102 may automatically input information regarding the user 100's current location and/or information regarding known 5 G small cells. Accordingly, the self-installation application may provide some enhanced guidance as to the location and/or orientation that may be optimal for FWA device 104.

In some embodiments, the self-installation application may have previously stored information regarding previously-run measurements/diagnostic information, and the self-installation application may leverage that previous/historical information to again, provide enhanced guidance to user 100. For example, the self-installation application may analyze previously-run installation instances to determine if any locations/orientations would likely result in optimal performance of FWA device 104. Alternatively, the self-installation application may filter out known locations/orientations that have already been tested and determined to result in poor or non-optimal operation of any FWA device, including FWA device 104. In some embodiments, as noted above, the identify of FWA device may be obtained. Such information may be used to determine certain operating characteristics of FWA device 104 that may impact determining a location/orientation for optimal operation. For example, FWA device 104 may have a different antenna configuration from a previously-installed FWA device 104. With this knowledge, the self-installation application may be able to provide guidance regarding location/orientation specifically tailored to FWA device 104. In still other embodiments, the self-installation application may perform certain triangulation or similar techniques that analyze some or all the measurements/diagnostic information obtained for previously-visited locations/orientations so that the self-installation application may be able to better predict where user 100 should go/how user 100 should orient FWA device 104 relative to a previous one(s) of locations/orientations.

User 100 may be given the option to end the measurement-taking phase of the self-installation process, e.g., upon the user 100 or the self-installation application being satisfied with the identified location(s)/orientation(s) tested. In the case of the self-installation application making such a determination, it should be understood that the self-installation application may be configured to compare, e.g., the current list of saved locations/orientations with one or more thresholds regarding one or more of the measured parameters, e.g., received signal strength, performance rating, data upload speed, data download speed, and/or latency. In some embodiments, combinations of factors may be taken into account when determining whether or not the location/orientation or some combination of locations/orientations are sufficient for a user 100 or the self-installation application to determine that the optimal or at least the best (for that situation) location/orientation has been identified.

Figure 4E:
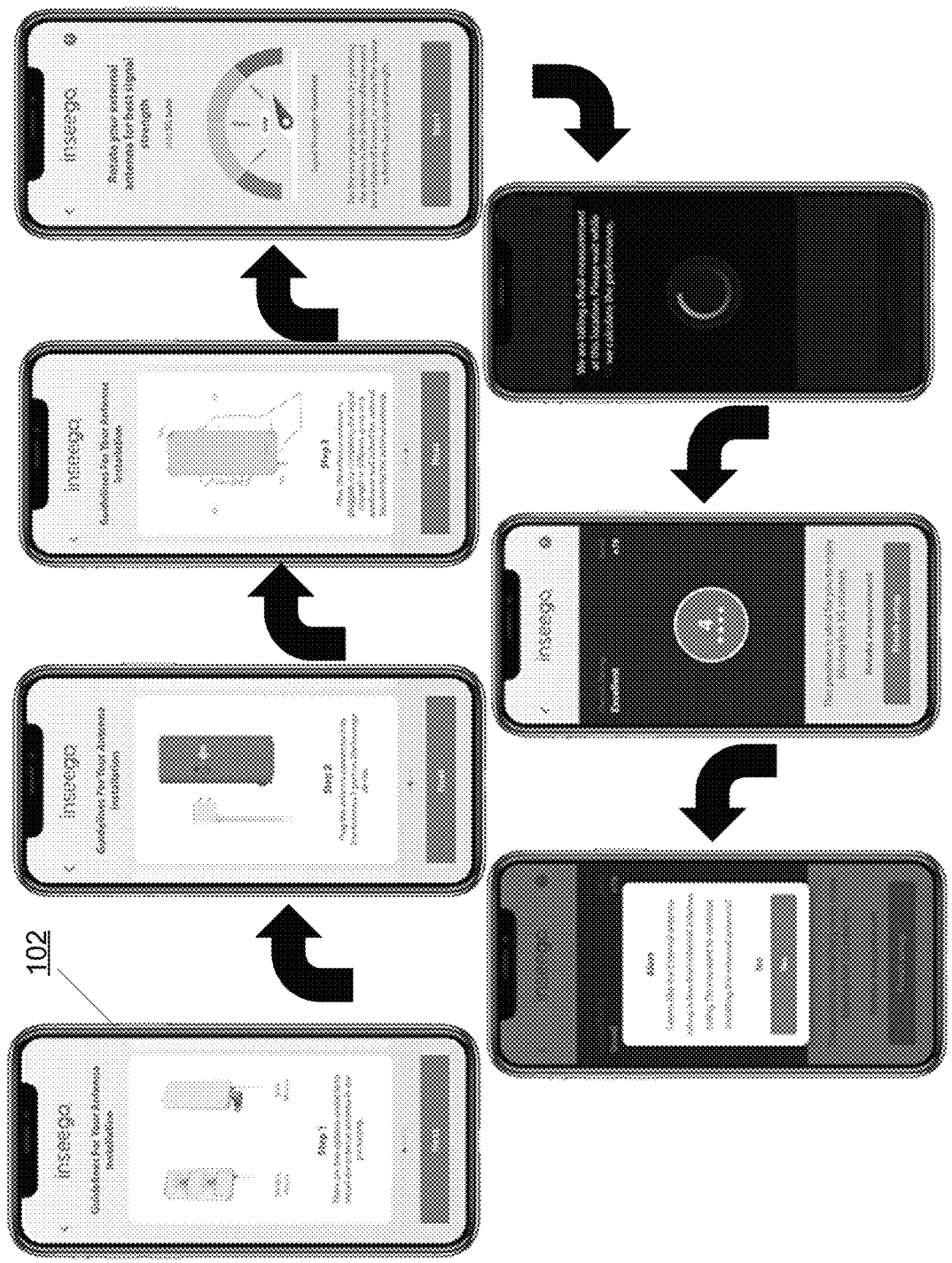
FIG. 4E illustrates example screenshots of an application used for installation of a FWA device in accordance with another embodiment.

FIG. 4E illustrates a plurality of screen shots that may be presented to user 100 on mobile device 102 signifying the installation process of an external antenna. The display guides the user 100 through powering on the antenna, moving the antenna to an appropriate location, and orienting the antenna to provide the best connection. As pictures in FIG. 4E, when the antenna has been installed, a final rating is given to the antenna's performance, as also displayed in FIGS. 4B and 4C. In some embodiments, the application has the ability to determine whether the use of an external antenna improves performance. If the connection worsens after the antenna is installed, the application can notify the user 100 that a better connection can be achieved. This gives the user 100 the option to disconnect from the external antenna and connect to a network.

Figure 4G:
FIGS. 4F-4G illustrate additional example screen shots of the application used for installation of a 5 G FWA device in accordance with another embodiment.
Figure 4F:
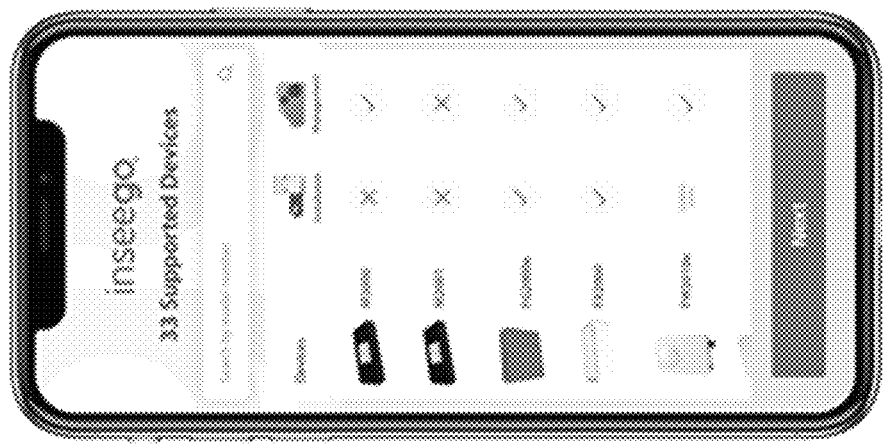
Figure 4I:
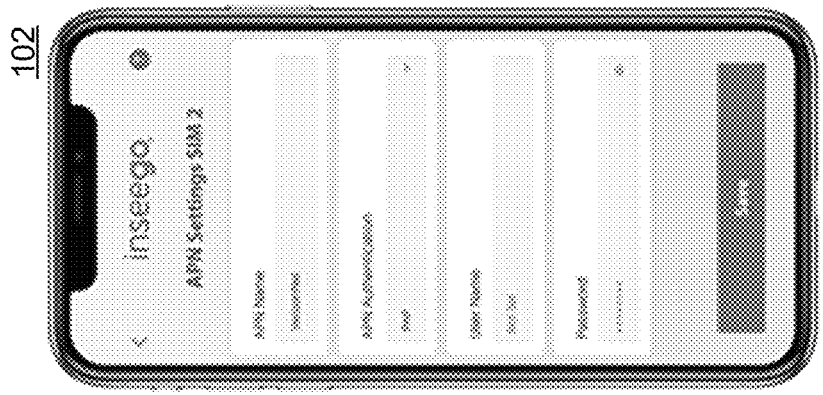
FIGS. 4H-4I illustrate additional example screen shots of the application used for installation of a 5 G FWA device in accordance with another embodiment.
Figure 4H:
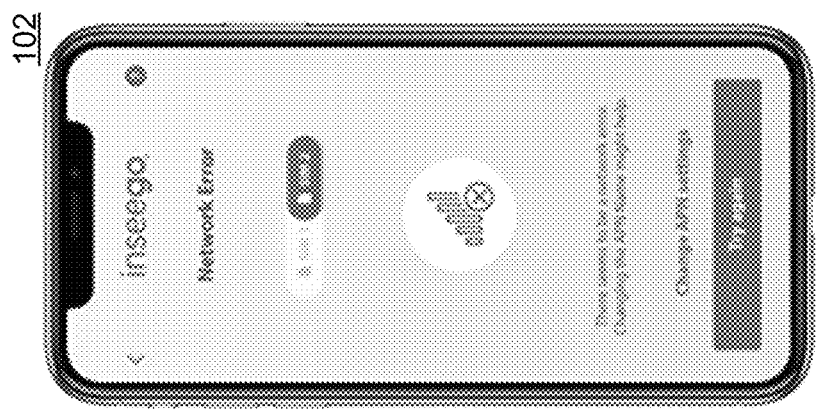

FIGS. 4F and 4G show other display screens that may be presented to the user 100 in other embodiments. In FIG. 4F, the user 100 is presented with a list of devices that support the application's set up capabilities. This list also provides the user with updates as to when other devices may be compatible with the self-installation application. The above-described screenshots may include certain textual and/or visual/graphical prompts, suggestions, commands, instructions, and the like. It should be understood that processor 102a of mobile device 100 may execute instructions or logic to determine operating status of the FWA device to which it may be paired, e.g., FWA device 104, operating status the self-installation application itself, etc. Moreover, processor 102a of mobile device 100 may execute instructions or logic to analyze current operating status (again of the self-installation application and/or 5 G FW device 104) and translate such operating status into corresponding instructions, indications, prompts, and the like. For example, memory 102b of mobile device may comprise a repository of, e.g., textual indications, prompts, etc. that can be triggered to be presented via a display upon the operating condition of the self-installation application and/or FWA device 104 reaching a certain state. In some embodiments, as noted above, the self-installation application may employ certain guidance logic, e.g., learning, feedback, predictive logic, etc. to provide guidance to a user. The processor 102a may execute instructions or logic to effectuate prompts, indicators, instructions, etc., commensurate with the guidance logic FIG. 4H-4I shows the display that may allow the user to change the Access Point Name (APN) of particular network. In some embodiments, the self-installation application is designed specifically for enterprise use, which gives administrators the ability to change the access points accordingly with the company's policy. As seen in FIG. 4H, a user is notified when the network connection fails. This prompts the user to change the APN settings to remediate the disconnection, as an incorrect APN can cause the LAN connection to disconnect from the cellular network, causing connectivity failures. This gives the user 100 more control over troubleshooting connectivity issues.

In some embodiments, the above-mentioned RSRP/diagnostics information or data may be compiled and used to generate an RSRP heat map of structure 101. For example, as part of the installation process, the self-installation application may prompt the user to traverse one or more areas of structure 101 (inside, outside, or both) so that RSRP/diagnostics information can be gathered. The self-installation application may store such information until a time that the user wishes to see the RSRP heat map and/or the self-installation application has reached some determined threshold number of locations/orientations/positions for which RSRP/diagnostics information has been gathered. For example, in some embodiments, user 101 may specify, via the self-installation application, the dimensions of structure 101, the number of rooms/areas contained in structure 301 (or other relevant information specifying an area of interest). The self-installation application may determine a number of RSRP/diagnostics readings or measurements to take based on the aforementioned information. In some embodiments, a listing of correlation between structure size/number of areas, location information for each measurement, and number or amount of RSRP/diagnostic measurements may be accessed by the self-installation application. In some embodiments, the type of structure and/or relevant characteristics relating to the structure, surrounding environment, etc. may be considered. For example, in an area with a dense concentration of small cells, e.g., a mixture of 5 G small cells such as 5 G small cell 140 and 142, more RSRP measurements may be taken to generate an RSRP heat map so as to attempt to assess connectivity to as many 5 G small cells as possible. Furthermore, this assessment can evaluate the presence of nearby 4 G cells and can increase the number of RSRP measurements in order to sufficiently measure all available networks. In other embodiments, the denser the population of 5 G small cells, the less RSRP measurements may be taken (or the less different locations/orientations may be considered) as multiple options for connectivity to a 5 G small cell may exist in any given location in/about structure 101. Similarly, in some embodiments with multiple 4 G small cells, less RSRP measurement may be taken to prioritize 5 G networks.

In some embodiments, multiple RSRP/diagnostics information may be collected at a particular location and the location/orientation associated with the "best" or "strongest" RSRP measurements may be used to generate the RSRP heat map. In some embodiments, all collected information can be presented to the user vis-a-visa the RSRP heat map. In some embodiments, the self-installation application may continuously assess the locations/orientations associated with collected RSRP/diagnostics information, and may automatically weed out less-favorable locations/orientations based on continually/periodically updated RSRP/diagnostics assessments.

In some embodiments, the self-install application (or other implementations for device management) may collect or store the collected RSRP/diagnostics information, and may automatically prompt a re-installation process, or notify a user of a recommendation to perform re-installation of a previously installed FWA device. In some embodiments, the collected RSRP/diagnostics information may be compared to one or more thresholds indicative of values, characteristics, etc., setting forth minimum or maximum operating values, characteristics, and the like. Upon a determination that the collected RSRP/diagnostics information meets or exceeds such a threshold(s), a notification to re-install a FWA device may be generated and transmitted to a user, e.g., through the self-install/device management application, through an associated email account, etc. In some embodiments, the comparison of the collected RSRP/diagnostics information to the aforementioned threshold(s) may be tracked such that one or more trends regarding RSRP/diagnostics information can be identified. If such a trend(s) is projected to meet/exceed a relevant threshold, re-installation or notification prompting/suggesting re-installation can be triggered. It should be understood that during 5 G network buildouts, as new 5 G small cells are deployed, and 5 G network connectivity densifies, the performance of a previously-installed FWA devices at an original/previous location and/or orientation can change. Accordingly, the self-install/device management application may determine that with current network information, the FWA device may get better performance in a different location/position within a particular structure.

Figure 4J:
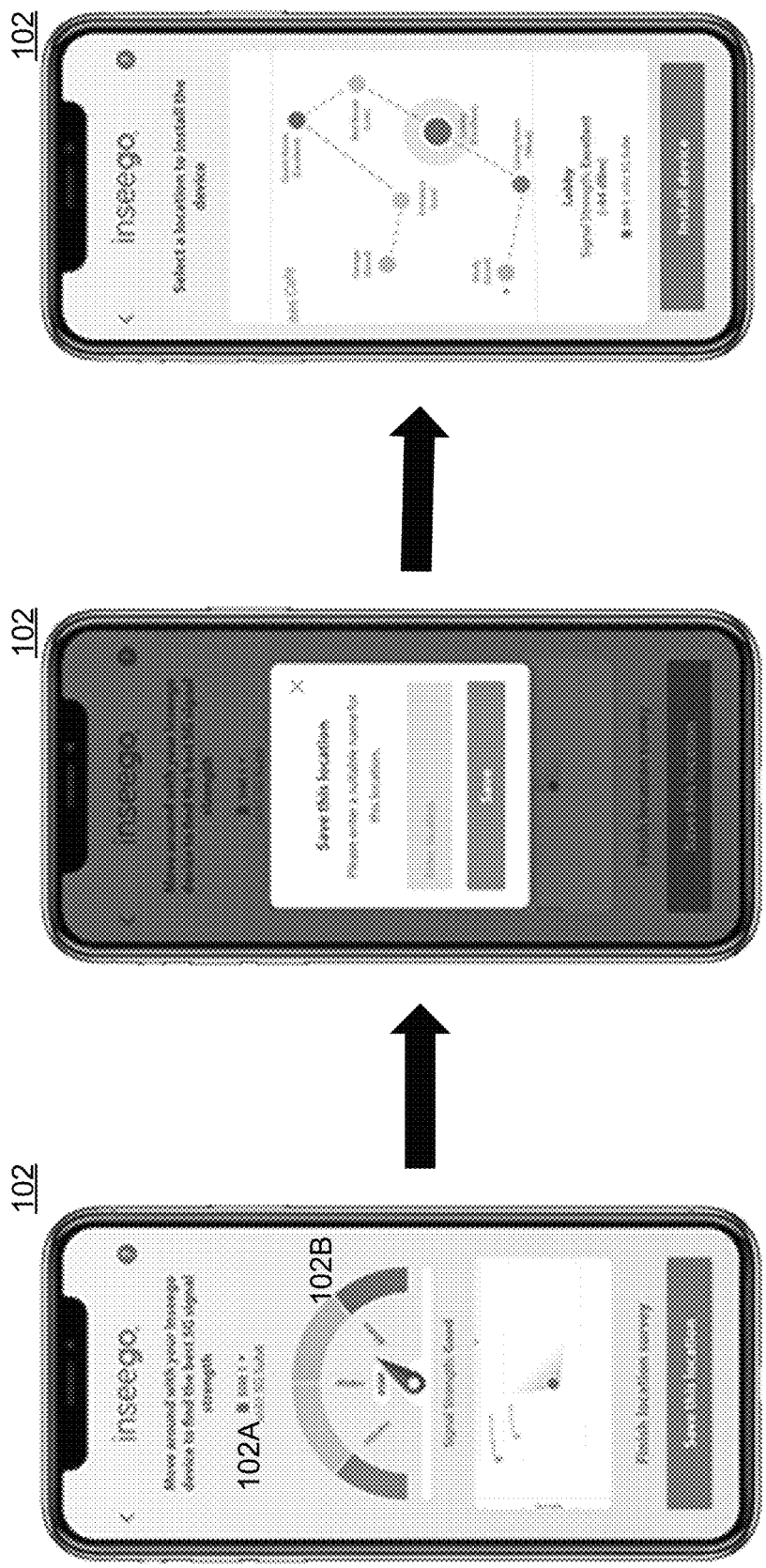
FIGS. 4J illustrate additional example screen shots of the application used for installation of a 5 G FWA device in accordance with another embodiment.

FIG. 4J illustrates the heat map display that may be generated in some embodiments. The user 100 is enabled to save particular locations to generate a point by point heat map. In other embodiments as discussed above, these measurements can be taken more frequently and automatically, resulting in a more detailed and accurate heat map. The display shows the user what direction the device is facing, allowing the user to predict the connectivity over a certain path once a heat map is generated. In some embodiments, the user 100 takes measurements using the mobile device 102 while viewing a speedometer 102A to measure the strength of the connectivity. The user may also switch to view the connectivity of a separate network using a tab 102A. Once a location is chosen, the user may save the location under a certain name and designate it for use in a heat map. A heat map is completed after the user completes the "location survey" after saving various locations. This heatmap also allows a user to see what network is being used at a certain point. In some embodiments, this heat map may be color coded so that users can easily compare locations and different networks.

Figure 5:
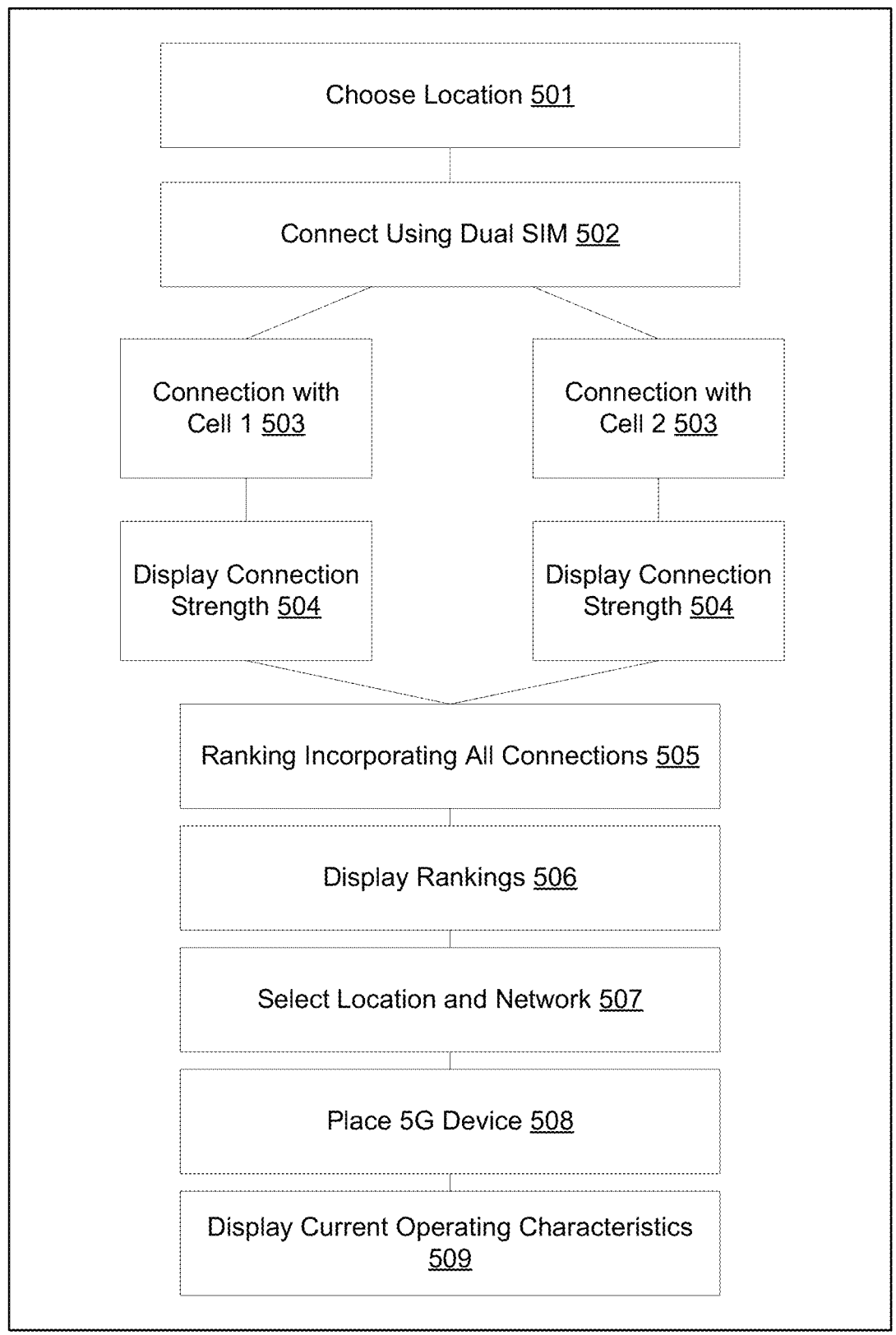
FIG. 5 illustrates an example method for self-installation of an FWA device in accordance with one embodiment of the disclosed technology.

FIG. 5 illustrates one embodiment of a method to place the FWA device. In this embodiment, some steps in FIG. 5 should be repeated amongst multiple locations to generate a more detailed list of rankings. First, the user 100 chooses a location 501 to measure connectivity. The user then connects the FWA device to two networks 502 to measure the connectivity of both networks simultaneously. After the device connects to both locations 503, the user is enabled to view a display of both networks' characteristics, as described above. The display 504 for each network shows the connection strength, which can include the RSRP values for more advanced users. This display can also include a connectivity speedometer 102A that color codes the efficacy of the connection. Afterwards, the location is saved and incorporated into a ranking 505 of all saved locations. At the start, this ranking will only include one saved network, so it is recommended to repeat the steps 501, 502, 503, 504, and 505 over multiple locations to give a user multiple options. Once these rankings are displayed 506, the user can then select an appropriate network and location 507. The FWA device should then be placed at this location 508. Once the device is settled, then the device 102 displays updated measurements 509 of one or more operating characteristics.

Figure 6:
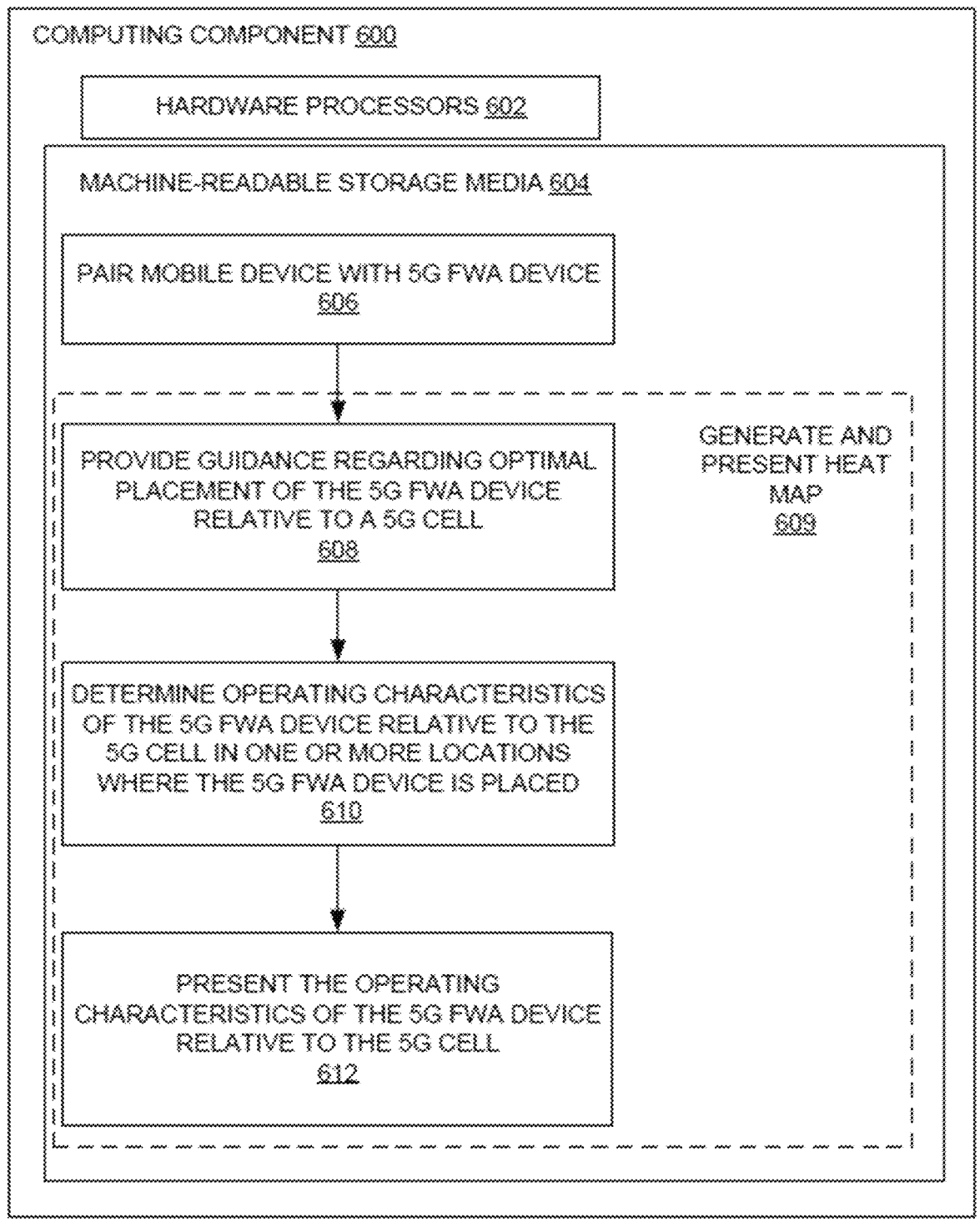
FIG. 6 illustrates a block diagram of an example computing component or device for performing self-installation functions in accordance with one embodiment.

FIG. 6 is a block diagram of an example computing component or device 600 for performing self-installation functions in accordance with one embodiment. Computing component 600 may be, for example, a server computer, a controller, or any other similar computing component capable of processing data and realizing the functionality of self-installation application. For example, computing component 600 may be a processor of mobile device 102a or it may be an embodiment of processor 421. In the example implementation of FIG. 6A, computing component 600 includes a hardware processor 602, and machine-readable storage medium 604.

Hardware processor 602 may be one or more Central Processing Units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-612, to control processes or operations for guiding a user in self-installation of a FWA device in accordance with one embodiment. As an alternative or in addition to retrieving and executing instructions, hardware processor 602 may include one or more electronic circuits that include electronic components for performing the functionality of one or more instructions, such as a Field Programmable Gate Array (FPGA), Application Specific Integrated Circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), Non-Volatile RAM (NVRAM), an Electrically Erasable Programmable Read-Only Memory (EE-PROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612, which may be representative of an embodiment of the aforementioned self-installation application.

Hardware processor 602 may execute instruction 606 to pair a mobile device with a FWA device. As alluded to above, hardware processor 602 may be an embodiment of a processor of mobile device 102*a*, and upon executing a self-installation application that a user may utilize to determine an optimal location(s)/orientation(s) of a FWA device the user wishes to install, the self-installation application may pair the mobile device and the FWA device to allow the exchange of information or data therebetween. Hardware processor 602 may execute instruction 608 to provide guidance regarding optimal placement of the FWA device relative to a 5 G cell. As noted above, the placement (e.g., location and/or orientation of a FWA device) relative to a 5 G cell, such as a small cell can be critically important in receiving 5 G broadband service. Again, the mmWave signals propagated through a 5 G network by 5 G small cells are of such high frequency that they are often or likely unable to penetrate structures, obstacles, and the like, thereby making their operation sensitive to their placement. The guidance that the self-installation application may provide can vary from providing a user with a mechanism for, e.g., randomly traversing an area and performing tests to determine how well the FWA device would operate in a certain location and/or orientation within that area. In other embodiments, the guidance that the self-installation application can include using information learned from previous installations (whether self-installed or installed in a conventional manner). For example, information regarding the location/orientation of a previously-installed FWA device(s) or information regarding attempts to previously install a FWA device(s) may be used to predict optimal locations/orientations or used to filter out non-optimal locations/orientations, etc.

In still other embodiments, providing guidance regarding the optimal placement of the FWA device may, as alluded to above, comprise generating and presenting one or more heat maps to a user, such as an RSRP and/or gNB heat map(s), or some combination thereof. That is, in accordance with some embodiments, locating a FWA device may comprise a more iterative process, where a user utilizes the self-installation application to assess the viability of a location by moving to that location, performing measurements/diagnostics, and subsequently looking at a listing of each location/orientation. In other embodiments, the user may perform data collection while traversing a location/area/structure, such as structure 101, and instead of presenting a listing of individual areas/corresponding RSRP/diagnostic information, the self-installation application can present a heat map-based representation. In some embodiments better predicted service/measured RSRP/diagnostics information can equate to "hotter" areas of the heat map.

Hardware processor 602 may execute instruction 610 to determine operating characteristics of the FWA device relative to the 5 G cell in one or more locations where the FWA device is placed (temporarily during the testing/determining of optimal location/orientation). As noted above, an optimal or preferable location/orientation of the FWA device may be premised on the operating characteristics, such as received signal strength, performance rating, data upload speed, data download speed, and/or latency experienced by the FWA device at a particular location depending on its connectivity to the 5 G cell. It should be understood that in some embodiments, the FWA device may be able to potentially receive service from more than one 5 G cell. Accordingly, the aforementioned testing, taking of measurements, running of diagnostic tests, etc. may be performed relative to each or some subset of the multiple 5 G cells that could potentially service the FWA device. It should be understood that when a heat map is generated, instruction 610 to determine operating characteristics of the FWA device may have already been accomplished or performed in multiple locations/orientations.

Hardware processor 602 may execute instruction 612 to present the operating characteristics of the FWA device relative to the 5 G CELL, e.g., to the user of the mobile device. In this way, a user of the self-installation application may be made aware of the operating characteristics of the FWA device that may determine the optimal placement of the FWA device. In some embodiments the user may be an end-consumer, or the user may be a professional installer. Although various embodiments have been described in the context of 5 G wireless broadband services and/or devices, the self-installation application disclosed herein may be adapted for use in other contexts where location/orientation of a device requires or would benefit from determining optimal or preferred placement. As alluded to above, the presentation of the operating characteristics, when utilizing the aforementioned heat map functionality may comprise presenting a heat map (RSRP and/or gNB) to the user.

Accordingly, in some embodiments, as illustrated in FIG. 6, operations 608, 610, and/or 612, may, in some embodiments comprise the generation and/or presentation of a heat map, e.g., RSRP and/or gNB heat map(s).

Figure 7:
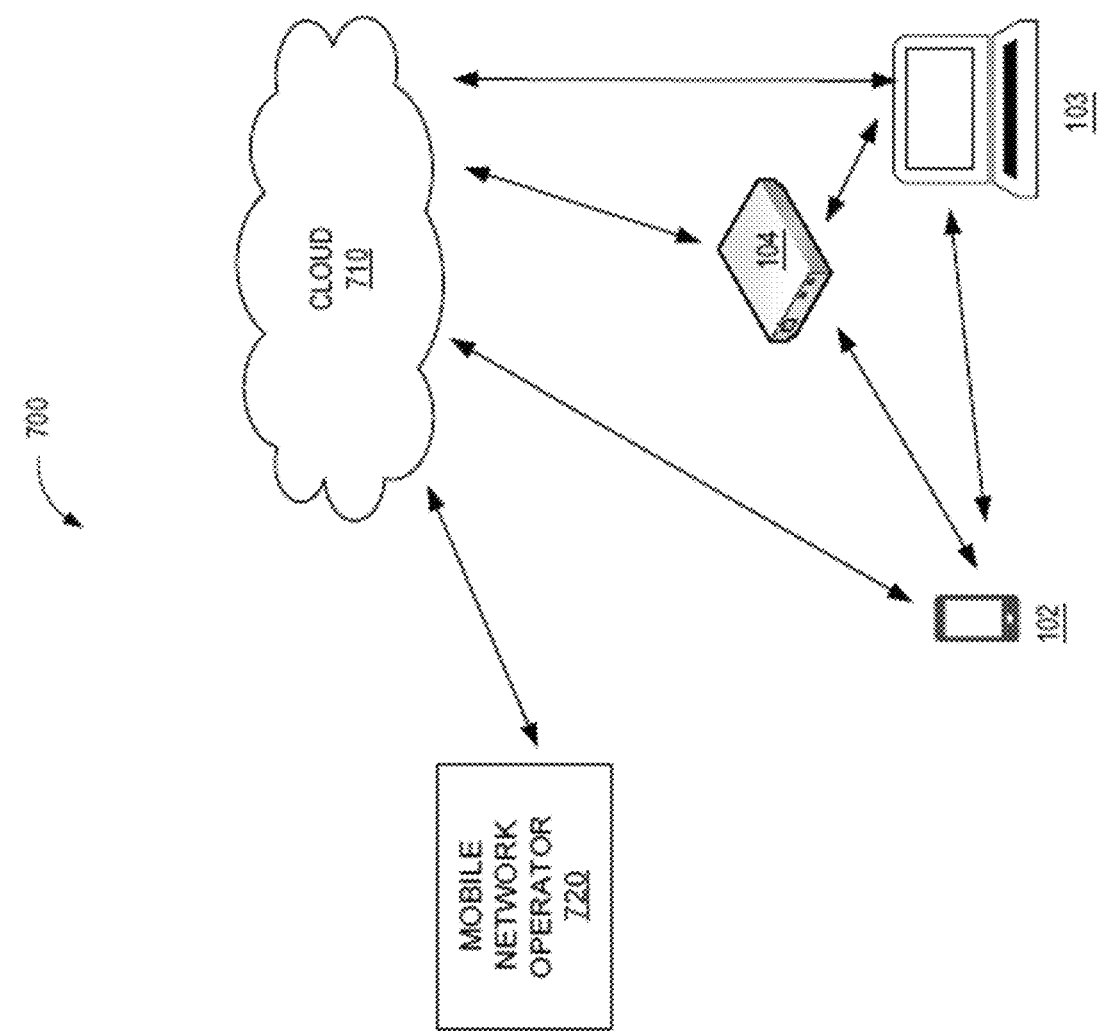
FIG. 7 illustrates an example device management system in accordance with one embodiment.

FIG. 7 illustrates an example device management system in accordance with one embodiment. As alluded to above, subsequent to installation of a FWA device, various embodiments may provide device monitoring/management functionality to a user. FIG. 7 illustrates a mobile device 102 on which the self-installation/device management application may be implemented and executed. Mobile device 102 may be operatively connected to FWA device 104 (as previously described). In some embodiments, the mobile device 102 may be connected to FWA device 104 over a near field communications mechanism, e.g., Bluetooth, Bluetooth LE, and so on, although other connectivity is contemplated. For example, mobile device 102 may connect to FWA device 104 over a Wi-Fi channel(s). In turn, FWA device 104 may be operatively connected to a cloud service/server 710 that can be implemented and managed by an entity, such as a vendor of FWA device 104. This connection can be established, e.g., over a cellular connection, e.g., a 5 G cellular connection. Cloud service 710 may in turn be operatively connected to MNO 720 via an Internet connection or other available connection mechanism.

As discussed above, the self-installation application may be implemented on mobile device 102. In some embodiments, device management may also be performed through mobile device 102. Device management can involve tracking information regarding the use and/or performance of a FWA device, such as FWA device 104. For example, after installation of a FWA device, a profile/information regarding that installed FWA device may be maintained by a device management application, one screen of which is presented on display 102. Information identifying the FWA device, such as model number, WAN IP address, and mobile number can be maintained and presented. Additionally, information such as current operating conditions/characteristics can be maintained and presented to a user to allow the user to assess the operation of an installed FWA device, or to assist customer service technicians in resolving customer/field issues. It should be understood that one or more mechanisms can be provided, such as pull-down menus and the like to access profiles or information corresponding to a plurality of installed FWA devices. Like the self-installation aspect described herein, differing levels of access/use, e.g., that geared towards consumers or customer support technicians can be implemented regarding device management. For example, more device management options and/or more to help debug a field issue versus that which can be presented to a user (e.g., a user may not understand all details of device management).

The FWA device profile or information can be presented/organized in a variety of ways. In one embodiment, soft buttons or actuable icons representative of different information/sets of information can be set forth on display. For example, a first set of information (e.g., "About Device") may be the FWA device's identification information, e.g., model, firmware, IMEI, MAC, PTN information, current operating conditions/characteristics (e.g., battery life, device health information (which may be gleaned from, e.g., online status information, temperature of the FWA device, from data usage information (described below), and so on). It should be noted that the information displayed is dynamic and can vary in accordance with preferences set forth by the user, FWA device manufacturer, vendor, etc. Moreover, FWA device-related or relevant information, such as information regarding the network to which the FWA device is attached can be provided/accessed.

It should be noted that some of the data or information listed above may be obtained during the installation process, but most tend to be dynamic and changing (sometimes constantly). These parameters can be extracted from the FWA device and periodically pushed to the cloud service where they can be monitored and processed with cloud computing resources that can include the use of one or more AI, machine learning, or similar algorithms/mechanisms for determining preferred installation locations/positions.

Data usage information may comprise additional information regarding the installed FWA device, and can include the amount of data uploaded and/or downloaded via the FWA device, one or more statistics, trends or other data usage-specific information, such as times, days, weeks, etc. of heaviest/lightest usage, data usage maxima/minima, network/device performance trends, and so on. If available, data usage information may include types of data traffic traversed through the FWA device. A user may set forth certain parameters regarding data usage and/or specify how data usage information can be presented.

It should be noted that in some embodiments, data usage information can be analyzed and further optimization information can be provided to a user. For example, it may be observed that data throughput through an installed FWA device may fall below some threshold, and may prompt an option notifying a user to re-install/find another location/orientation of the installed FWA device. That is, the location/orientation of the installed FWA device may have shifted or otherwise changed, the operating environment may have changed, the performance of the 5 G small cell to which the installed FWA device connects may have changed, etc.

For example, a summary of a data plan associated with the FWA device may be presented as part of data usage information, along with an indication, e.g., percentage, of how much data has been used/is left in the data plan, data/data plan validity, etc. A user may additionally set one or more constraints, thresholds, and the like regarding data usage. For example, a user may set daily data usage limits, and the data usage information can be presented in the context of the data used by one or more devices, e.g., mobile devices, connected to and using the FWA device. In some embodiments, data usage information, statistics, etc. for each connected mobile device can be presented to the user.

In some embodiments, settings such as Wi-Fi settings and/or other device-specific or device-related configuration settings/parameters/values may be presented to the user via the device management application. For example, one or more options can be presented to the user regarding whether or not Wi-Fi should be enabled/provided by the installed FWA device. In some embodiments, the FWA device may have multiple radios operating in different frequencies, and a user can be presented with options to select one or more of those frequencies or frequency ranges for operation. Primary and guest network configuration options may be accessed and activated/selected by user via the device management application. Still other device options, such as options to reboot, perform a factory reset on, reinstall, and/or delete an installed FWA device can be provided in accordance with some embodiments. Further still, options to allow or block to-be-connected or connected mobile/Wi-Fi devices can be specified. Moreover, user accounts/profiles/related information can be specified and/or otherwise configured via the device management application. For example, in some embodiments, an email address to which operational notifications (loss of power, performance below a threshold, new mobile device connection to the installed FWA device, etc.) can be sent to a user may be specified. It should be noted that the above-described embodiments are not meant to be limiting. Any relevant information/management aspects of an installed FWA device (or associated devices, e.g., connected mobile/Wi-Fi devices) can be monitored and/or managed via the device management application disclosed herein. In some embodiments, help functions can be provided to a user vis-à-vis the device management application.

Returning to FIG. 7, and as alluded to above, a direct, local connection can be effectuated between an installed FWA device, such as FWA device 104 and a computing device, such as computer 103. Computer 103 may access any one or more of the aforementioned aspects or functionality provided vis-à-vis the mobile device-based device management application through a web-based UI. As noted above, a user may be able to switch between various UIs/user devices when managing a FWA device. Thus, in some embodiments, current information, settings, profiles, etc. may be shared between various user devices, in this case, mobile device 102 and computing device 103. In other embodiments, cloud service 710 may be a centralized management function or service that can maintain the relevant information, settings, profiles, and so on, and periodically, aperiodically, and/or as needed, update or communicate such information or changes to mobile device 102 and/or computing device 103. Similarly, a user(s) may perform device management of a FWA device(s) via a cloud-based service(s) accessible directly from the cloud service 710 (which can be hosted on one or more servers). In this way, even if a user is remote from an installed FWA device, he/she may effectuate control over/manage that FWA device.

In some embodiments, one or more cloud APIs may be used by MNO, mobile device 102, and computing device 103 to access the aforementioned cloud-based device management application(s)/functionality(ies)/tool(s). For example, cloud service 710 may expose a REST interface via such cloud APIs that can be called by MNO, computing device 103, and mobile device 102. It should be understood that use of the RESTful architecture is only an example, and other alternatives, e.g., GraphQL, Falcor, gRPC, JSON-Pure, oData APIs, etc. may be utilized. In some embodiments, such cloud APIs can be infrastructure APIs that can control the distribution of cloud services, e.g., device provisioning services (described above). In some embodiments such cloud APIs may be software as a service APIs that can refer to application level APIs that facilitate connectivity between FWA device 104 and other network entities/devices, e.g., mobile device 102, computing device 103, and MNO 720. In some embodiments, platform as a service APIs may be used to provide integration with messaging systems (for transmitting/receiving relevant FWA device-related notifications, for example), databases (for obtaining/storing FWA device-relevant information), etc.

Figure 8:
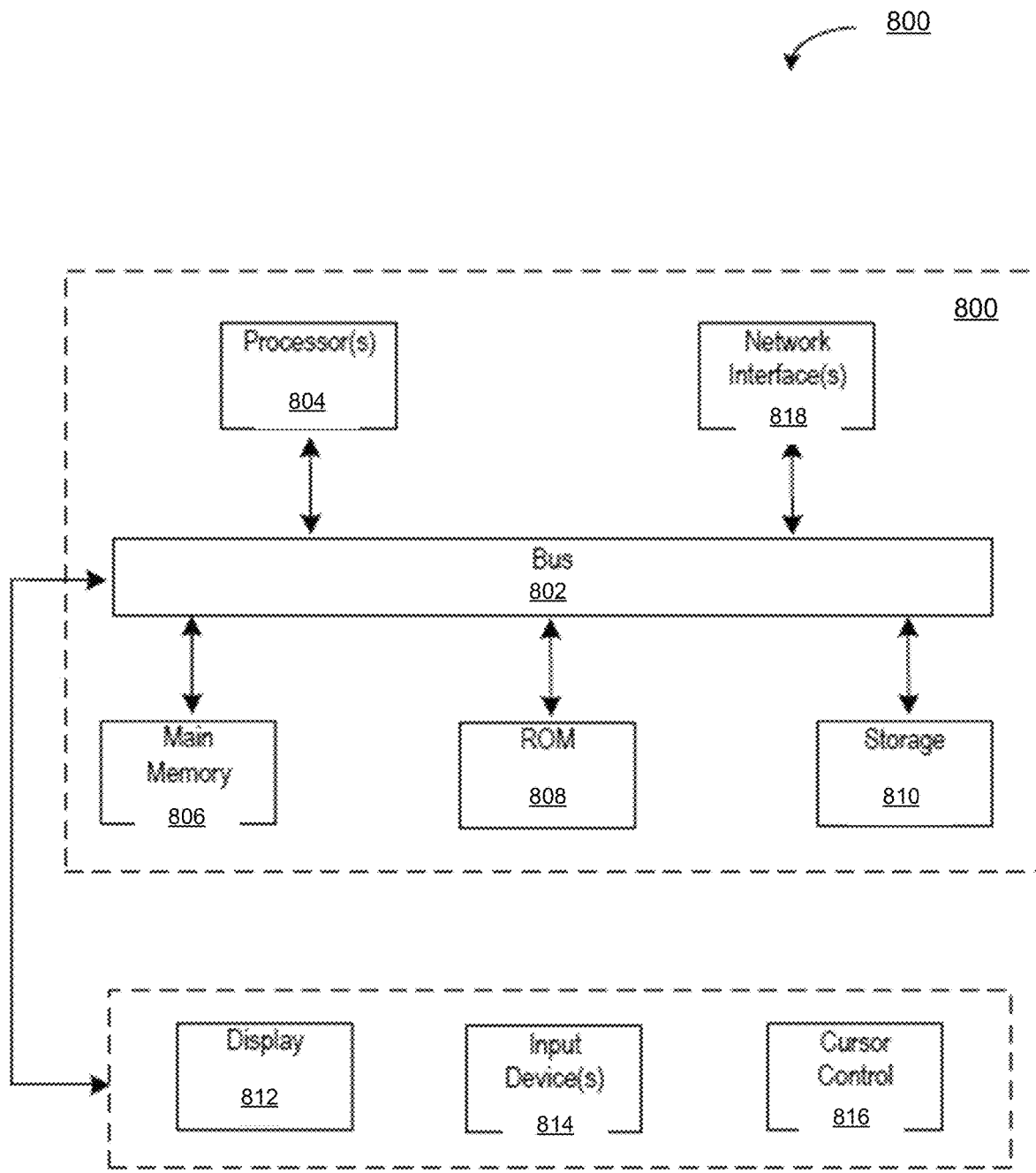
FIG. 8 illustrates a block diagram of an example computing component or device for effectuating device management in accordance with some embodiments.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a Random Access Memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a Read Only Memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions. Also coupled to bus 802 are a display 812 for displaying various information, data, media, etc., input device(s) 814 for allowing a user of computer system 800 to control, manipulate, and/or interact with computer system 800. One manner of interaction may be through a cursor control 816, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile device, comprising:
 a processor; and
 a memory unit operatively coupled to the processor, the memory unit including computer code that when executed, causes the processor to:
  pair the mobile device with a Fixed Wireless Access (FWA) device;
  locate one or more mobile networks, each of the one or more mobile networks being associated with a subscriber identification module (SIM);
  determine operating characteristics of the FWA device relative to each mobile network in one or more locations where the FWA device is placed using each corresponding SIM;
  present the operating characteristics of the FWA device relative to each mobile network via the mobile device, allowing a user to view each network's characteristics separately, the operating characteristics being ranked based on the one or more locations at which the FWA device is operating; and
  provide guidance regarding optimal placement of the FWA device based on the ranking of the measurements.

2. The mobile device of claim 1, wherein the operating characteristics are determined by one or more performance measurements.

3. The mobile device of claim 1, further comprising an external antenna accessory and wherein the memory unit's computer code, when executed, further causes the processor to provide guidance regarding at least one of mounting the external antenna accessory in a certain orientation or adjusting the orientation of the external antenna accessory on the mobile device.

4. The mobile device of claim 2, wherein the memory unit's computer code, when executed, further causes the processor to determine whether the external antenna produces an improved throughput and notify the user if the connection worsens.

5. The mobile device of claim 1, wherein the memory unit's computer code, when executed further causes the processor to display a speedometer that measures the signal strength of the mobile network and displays the signal strength in real time.

6. The mobile device of claim 5, wherein the speedometer is accompanied by a separate compass that determines the direction of a relevant cell tower.

7. The mobile device of claim 1, wherein the memory unit's computer code, when executed further causes the processor to save each network and their relative signal strengths and generate a heat map of the saved locations using GPS coordinates.

8. The mobile device of claim 7, wherein the memory unit's computer code, when executed further causes the processor to receive the GPS coordinates from a user input.

9. The mobile device of claim 1, wherein the rankings are displayed according to a hierarchy that incorporates the relative signal strengths of 5 G and 4 G networks.

10. The mobile device of clam 1, wherein the memory unit's computer code, when executed further causes the processor to alternate between using 5 G and 4 G networks depending on the needed coverage.

11. A method of determining placement of a Fixed Wireless Access (FWA) device, comprising:
 determining operating characteristics of the FWA device upon connecting to one or more 5 G cells using each of a plurality of subscriber identity modules (SIMS);
 displaying the connection strength of each cell at one or more locations;
 ranking the connection strength of each cell at each of the one or more locations;
 presenting a list of the rankings to a user and allowing the user to select a location and cell;
 providing guidance instructing a user to place the 5 G device at the selected location and connecting to the selected cell; and
 displaying the connection strength at the chosen cell and location with a dynamic display that updates in real time.

12. The method of claim 11, wherein determining operating characteristics includes obtaining one or more performance measurements.

13. The method of claim 11, further comprising taking a photograph of each location that is ranked and displaying the photograph of each location with the ranking.

14. The method of claim 11, wherein displaying the connection strength of each cell at each location involves a real-time visual representation of a speedometer with an arrow that dynamically changes as the user moves the device.

15. The method of claim 14, further comprising connecting to a different cell and changing the speedometer to display the connection to the new cell.

16. The method of claim 11, further comprising presenting guidance instructing a user to rotate the 5 G device and determining what orientation optimizes connection.

17. The method of claim 11, further comprising displaying a heat map for each cell based on the GPS coordinates of each measured location.

18. The method of claim 11, wherein the rankings comprise at least one of a numerical ranking or a written statement as to the location's strength.

19. The method of claim 11, further comprising presenting guidance instructing a user to mount an external antenna and guiding the user on locating the optimal location for the antenna using a signal strength speedometer.

20. The method of claim 19, further comprising determining whether the antenna improves the connection and disconnecting the antenna if connection worsens.

\* \* \* \* \*